US010488678B1

(12) United States Patent
Lemoff et al.

(10) Patent No.: US 10,488,678 B1
(45) Date of Patent: Nov. 26, 2019

(54) FOLDED OPTICAL DESIGN FOR EYE-MOUNTED CAMERAS

(71) Applicant: Spy Eye, LLC, Los Gatos, CA (US)

(72) Inventors: Brian Elliot Lemoff, Morgan Hill, CA (US); Michael West Wiemer, San Jose, CA (US)

(73) Assignee: Tectus Corporation, Saratoga, CA (US)

( * ) Notice: Subject to any disclaimer, the term of this patent is extended or adjusted under 35 U.S.C. 154(b) by 58 days.

(21) Appl. No.: 16/001,778

(22) Filed: Jun. 6, 2018

(51) Int. Cl.
 G02C 11/00 (2006.01)
 H04N 5/225 (2006.01)
 G02C 7/04 (2006.01)

(52) U.S. Cl.
 CPC ............. G02C 11/10 (2013.01); G02C 7/04 (2013.01); H04N 5/2254 (2013.01)

(58) Field of Classification Search
 CPC ......... G02C 11/10; G02C 7/04; H04N 5/2254
 USPC ................... 351/41, 159.01, 159.02
 See application file for complete search history.

(56) References Cited

U.S. PATENT DOCUMENTS

| | | | |
|---|---|---|---|
| 4,711,512 A | 12/1987 | Upatnieks | |
| 5,638,218 A | 6/1997 | Oomura | |
| 5,638,219 A | 6/1997 | Medina Puerta et al. | |
| 6,560,039 B1 | 5/2003 | Webb et al. | |
| 8,096,654 B2* | 1/2012 | Amirparviz | B29D 11/00826 345/8 |
| 8,134,778 B2 | 3/2012 | Guyer | |
| 8,571,789 B2 | 10/2013 | Monde et al. | |
| 8,786,675 B2 | 7/2014 | Deering | |
| 8,956,281 B2 | 2/2015 | Wilson | |
| 8,971,978 B2* | 3/2015 | Ho | A61B 5/0004 600/318 |
| 9,063,352 B2 | 6/2015 | Ford et al. | |
| 9,111,473 B1 | 8/2015 | Ho | |
| 9,134,534 B2 | 9/2015 | Border et al. | |
| 9,251,745 B2 | 2/2016 | Sprague | |
| 10,353,204 B2* | 7/2019 | Miller | G02C 7/04 |
| 2002/0140906 A1 | 10/2002 | Gibbon et al. | |

(Continued)

FOREIGN PATENT DOCUMENTS

GB 1216075 A 12/1970

OTHER PUBLICATIONS

All-Reflecting Two-Mirror Telescopes, (Aug. 3, 2016), URL: https://web.archive.org/web/20160803183105/http://www.telescope-optics.net/two-mirror.htm, (Dec. 14, 2017) (5 pages).
Song et al "Baffles design for the axial two-mirror telescope", Optical Engineering, 2002, vol. 41, No. 9, pp. 2353-2357.
Avago Technologies, "ADNE-2620 Optical Mouse Sensor Data Sheet," Mar. 27, 2008, 27 pages.

(Continued)

*Primary Examiner* — Tuyen Tra
(74) *Attorney, Agent, or Firm* — Fenwick & West LLP

(57) ABSTRACT

An eye-mounted device includes a contact lens and an embedded camera, which for convenience will be referred to as a femtocamera. The front aperture of the femtocamera faces away from the user's eye so that the image sensor in the femtocamera detects imagery of a user's external environment. The femtocamera optics has a folded optical path, which is advantageous for fitting the femtocamera into the limited space within the contact lens. In one design, the optics for the femtocamera is based on a two mirror design, with a concave mirror followed by a convex mirror. In an alternate design, the optics for the camera includes an imaging lens near the front aperture.

20 Claims, 26 Drawing Sheets

(56) References Cited

U.S. PATENT DOCUMENTS

| | | |
|---|---|---|
| 2005/0180687 A1 | 8/2005 | Amitai |
| 2009/0185135 A1 | 7/2009 | Volk |
| 2009/0189830 A1 | 7/2009 | Deering et al. |
| 2010/0033561 A1 | 2/2010 | Hersee |
| 2011/0176205 A1 | 7/2011 | Shaw et al. |
| 2011/0221658 A1 | 9/2011 | Haddick |
| 2011/0221659 A1 | 9/2011 | King, III et al. |
| 2013/0278631 A1 | 10/2013 | Border |
| 2014/0098226 A1 | 4/2014 | Pletcher et al. |
| 2014/0118829 A1 | 5/2014 | Ma |
| 2014/0204003 A1 | 7/2014 | Deering |
| 2015/0301338 A1 | 10/2015 | Van Heugten |
| 2015/0312560 A1 | 10/2015 | Deering et al. |
| 2016/0026253 A1 | 1/2016 | Bradski |
| 2016/0097940 A1 | 4/2016 | Sako et al. |
| 2016/0150951 A1 | 6/2016 | Du |

OTHER PUBLICATIONS

"8.2 All-Reflecting Two-Mirror Telescopes," Datasheet telescope-optics, telescope-optics.net, Aug. 3, 2016, 4 pages, [Online] [Retrieved on Dec. 14, 2017] Retrieved from the Internet<URL:https://web.archive.org/web/20160803183105/http://www.telescope-optics.net/two-mirror.htm>.

PCT International Search Report and Written Opinion, PCT Application No. PCT/US17/57240, dated Jan. 12, 2018, 23 pages.

Peifu, G., "Design and Preparation of Quarter-Wave Plate Coatings," National Air Intelligence Center, May 12, 1995, 16 pages.

Tremblay, E.J. et al., "Ultrathin Cameras Using Annular Folded Optics," Applied Optics, pp. 463-471, vol. 46, No. 4.

International Search Report and Written Opinion for Application No. PCT/US19/39013, dated Aug. 29, 2019, 15 pages.

\* cited by examiner

FOLDED OPTICAL DESIGN FOR EYE-MOUNTED CAMERAS

BACKGROUND

1. Technical Field

This disclosure relates generally to an eye-mounted camera.

2. Description of Related Art

Handheld cameras are ubiquitous. A large fraction of the world's population carries smartphones and most smartphones have one or more cameras. This allows people to document their lives and experiences. Pictures and videos of epic events, spectacular vacations and lifetime milestones are routinely captured by handheld cameras. At the other end of the spectrum, the number of selfies, cat videos and pictures of mediocre meals has also exploded in recent years.

Body-mounted cameras or body-cams go one step further. They automatically go where the user goes and can automatically record what the user is experiencing. Head-mounted or helmet-mounted cameras go even one step further. They automatically view what the user is viewing or, at least where he turns his head. They can record events from this point of view.

However, all of these cameras are separate pieces of equipment that are visible to others. They are also relatively large and are not carried on the user's eye.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to embodiments by way of illustration only. It should be noted that from the following discussion, alternative embodiments of the structures and methods disclosed herein will be readily recognized as viable alternatives that may be employed without departing from the principles of what is claimed.

An eye-mounted device includes a contact lens and an embedded camera, which for convenience is referred to as a femtocamera because it is very small. The front aperture of the femtocamera faces away from the user's eye so that the image sensor in the femtocamera captures imagery of a user's external environment. In various embodiments, the femtocamera operates in a visible wavelength band, a non-visible wavelength band, or a combination of both.

The femtocamera optics has a folded optical path, which is advantageous for fitting the femtocamera into the limited space within the contact lens. In one design, the optics for the femtocamera is a two mirror design, with a concave mirror followed by a convex mirror in the optical path from the front aperture to the image sensor. In an alternate design, the optics for the camera includes an imaging lens near the front aperture. Turning mirrors fold the optical path from the imaging lens to the image sensor, so that the image sensor faces the user's eye. In addition to providing a longer optical path length, this design also allows the image sensor to be placed close to a surface of the contact lens that is accessible during manufacturing. Facing the image sensor towards the user's eye may also reduce the amount of stray light incident on the image sensor.

The eye-mounted device can include other components in the contact lens: a projector that projects images onto the retina, other types of sensors, electronics, a coil to wirelessly receive power, and/or an antenna to transmit/receive data, for example. These components, including the femtocamera, may be positioned in front of the pupil in the optical path of the eye. Some components must be positioned within this optical zone, for example in order to project images onto the retina. Other components may be positioned outside the optical zone. The femtocamera may be either within or outside the optical zone.

Figure 1A:
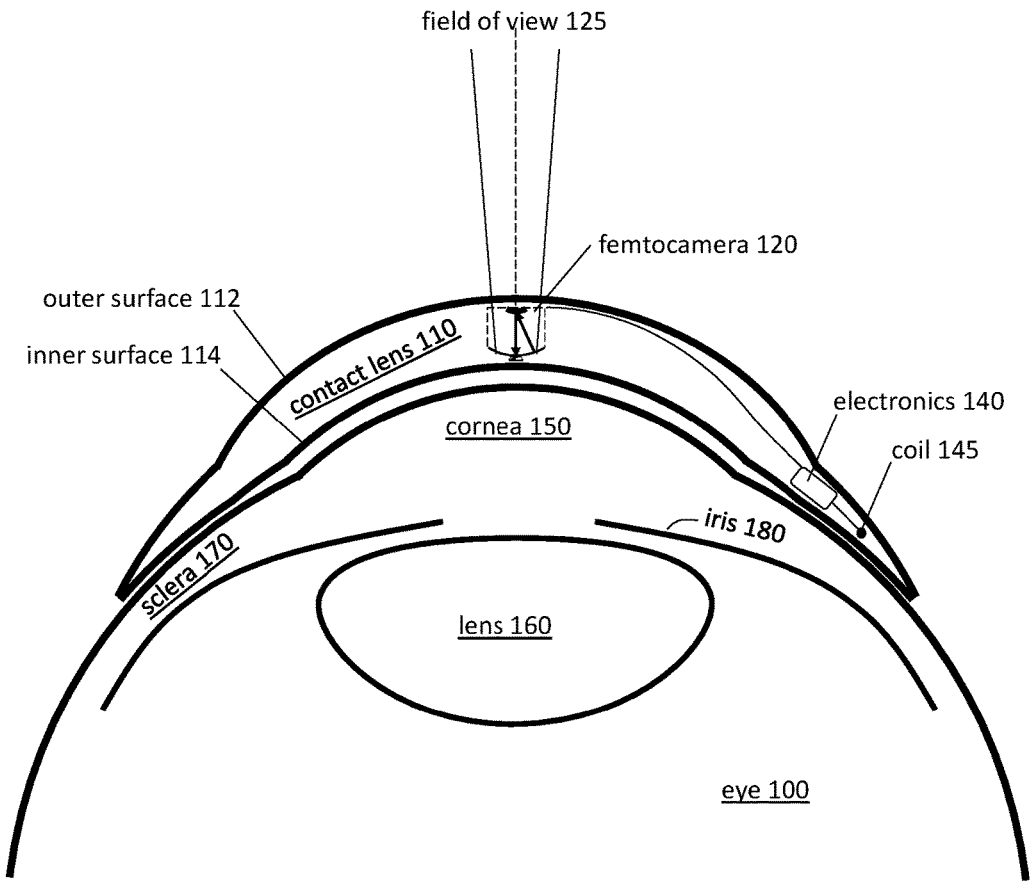
FIG. 1A shows a cross sectional view of a contact lens device with an embedded camera.

In more detail, FIG. 1A shows a cross sectional view of a contact lens 110 of an eye-mounted device. The contact lens 110 contains an embedded femtocamera 120. FIG. 1A shows an embodiment using a scleral contact lens but the contact lens 110 does not have to be scleral. The contact lens 110 preferably has a thickness that is less than two mm. The femtocamera 120 preferably fits in a 1 mm×1 mm×1 mm volume, or at least within a 2 mm×2 mm×2 mm volume. The contact lens 110 is comfortable to wear and maintains eye health by permitting oxygen to reach the cornea 150.

For completeness, FIG. 1A shows some of the structure of the eye 100. The contact lens 110 is separated from the cornea 150 of the user's eye 100 by a tear layer. Over the cornea 150, the tear layer may be as thick as a hundred microns or more while it may be only a few microns thick over the sclera 170. The aqueous of the eyeball is located between the cornea and the crystalline lens 160 of the eye 100. The vitreous fills most of the eyeball. The iris 180 limits the aperture of the eye.

The femtocamera 120 is an outward-facing camera, meaning the femtocamera 120 "looks" away from the eye 100 and captures imagery of the surrounding environment. The field of view 125 of the femtocamera 110 can be the same, smaller or larger than a field view of the user's eye. As shown in more detail below, the femtocamera 110 includes imaging optics, a sensor array and sensor circuitry. The sensor array can be an array of photodiodes. In some embodiments, the sensor array operates in a visible wavelength band (i.e., ~390 nm to 770 nm). Alternatively or additionally, the sensor array operates in a non-visible wavelength band, such as an infrared (IR) band (i.e., ~750 nm to 10 μm) or an ultraviolet band (i.e., <390 nm). For example, the sensor array may be a thermal infrared sensor.

The sensor circuitry senses and conditions sensor signals produced by the sensor array. In some instances, the output signals produced by the sensor circuitry are analog signals. Alternatively, the sensor circuitry may include analog-to-digital converters (ADC), so that the output signals are digital rather than analog. The sensor circuitry can also have other functions. For example, the sensor circuitry may amplify the sensor signals, convert them from current to voltage signals or filter noise from the sensor signals to keep a signal-to-noise ratio below a threshold value. The sensor circuitry may be implemented as a separate electronics module 140. Alternatively, it may be implemented as a backplane to the sensor array. In some cases, processing of the images captured by the femtocamera occurs outside the contact lens 110.

Figure 1B:
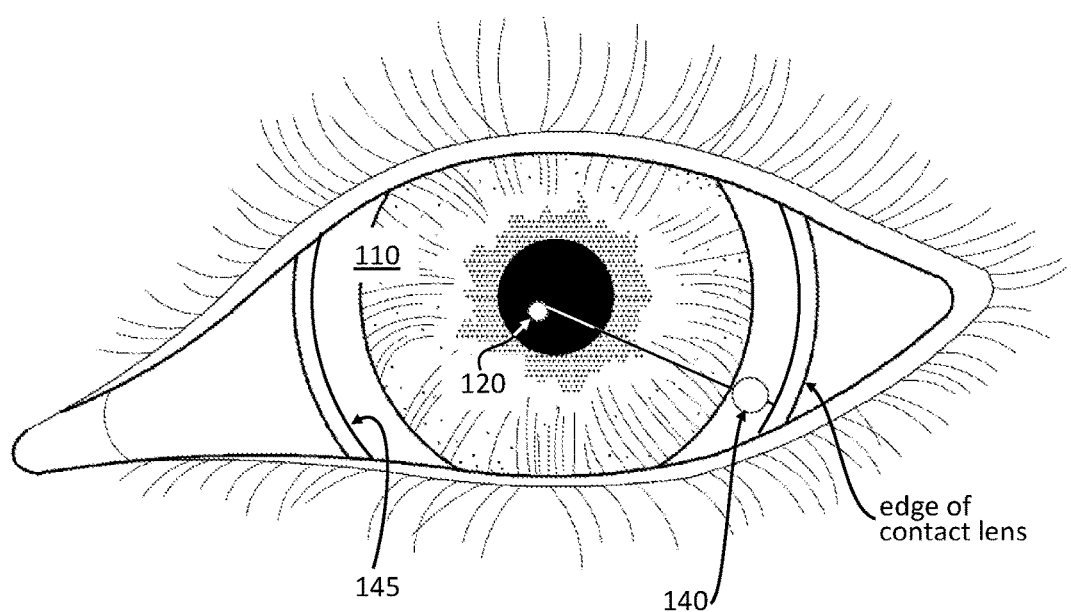
FIG. 1B shows a view of the contact lens device mounted on a user's eye.

FIG. 1B shows a front view of the contact lens 110 mounted on a user's eye 100. The contact lens 110 is placed on the surface of the eye 100. The contact lens 110 moves with the user's eye 100 as the user's eye rotates in its socket. Because the femtocamera 120 is mounted in the contact lens 110, it also moves with the user's eye. The ratio of the contact lens diameter to femtocamera lateral size is preferably roughly 15:1. This ratio is normally between about 15:1 and 30:1, but may be as small as 5:1 or smaller or as large as 50:1 or larger. If the femtocamera is in the optical zone, the lateral size affects the amount of light obstructed by the femtocamera and reduces the amount of light received at the retina. If the femtocamera is outside the optical zone, the femtocamera does not obstruct light entering the eye.

In this example, the contact lens 110 also contains electronics 140 and a coil (or antenna) 145. In some embodiments, the coil 145 is a power coil that receives power wirelessly, for example via magnetic induction. In other embodiments, the contact lens 110 includes a battery that supplies power to the femtocamera 120. The electronics 140 may be used to control the femtocamera, receive or process images from the femtocamera, provide power to the femtocamera, and/or transmit data to/from the femtocamera. The contact lens 110 may also include other components, such as a projector that projects images onto the user's retina (referred to as a femtoprojector).

Figure 2A:
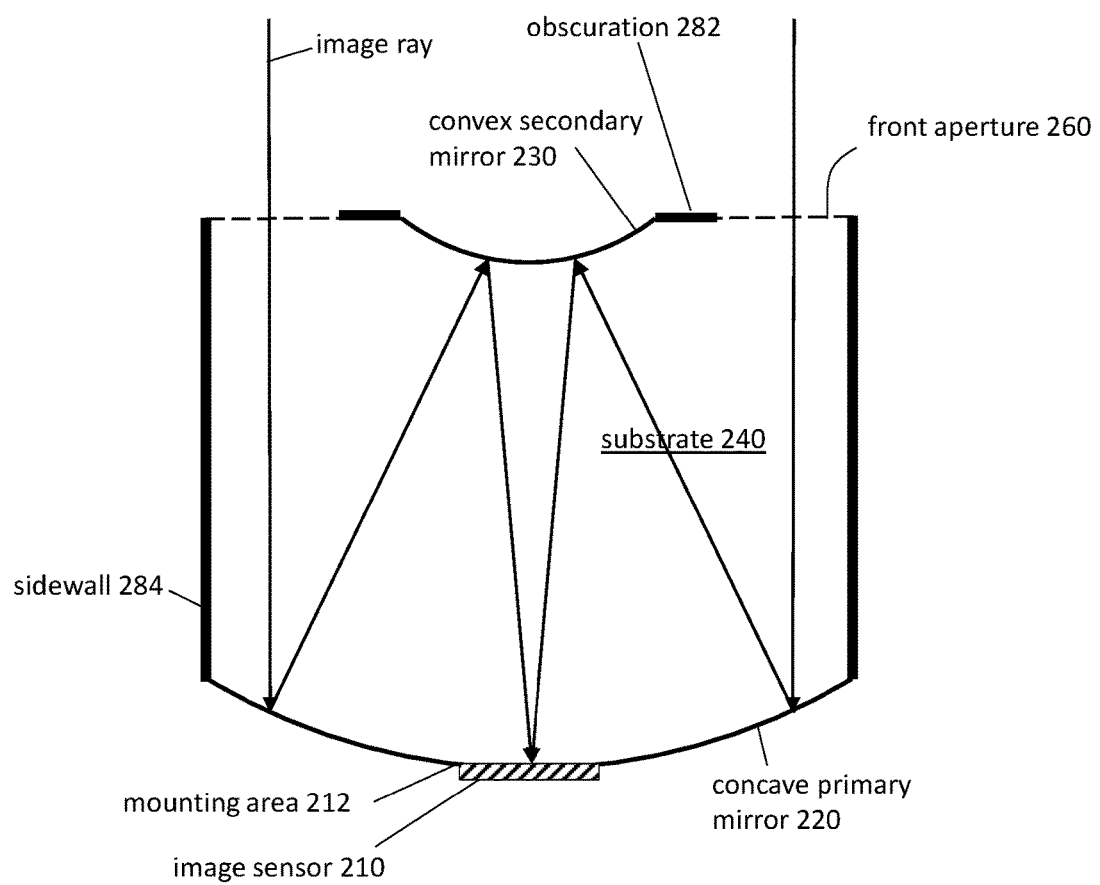
FIGS. 2A and 2B show a cross sectional view and perspective view of a femtocamera using two mirrors.
Figure 2B:
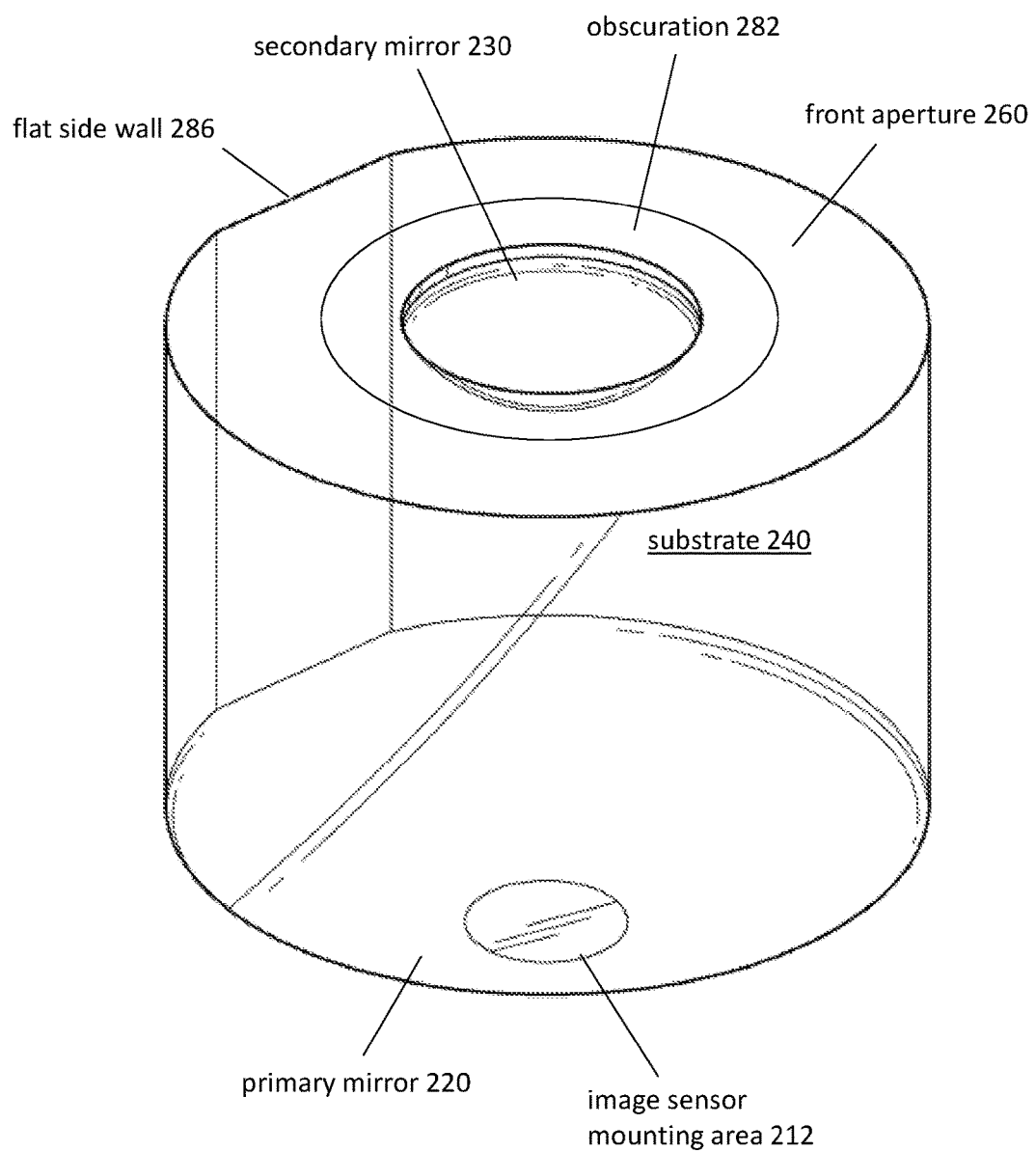
Figure 3:
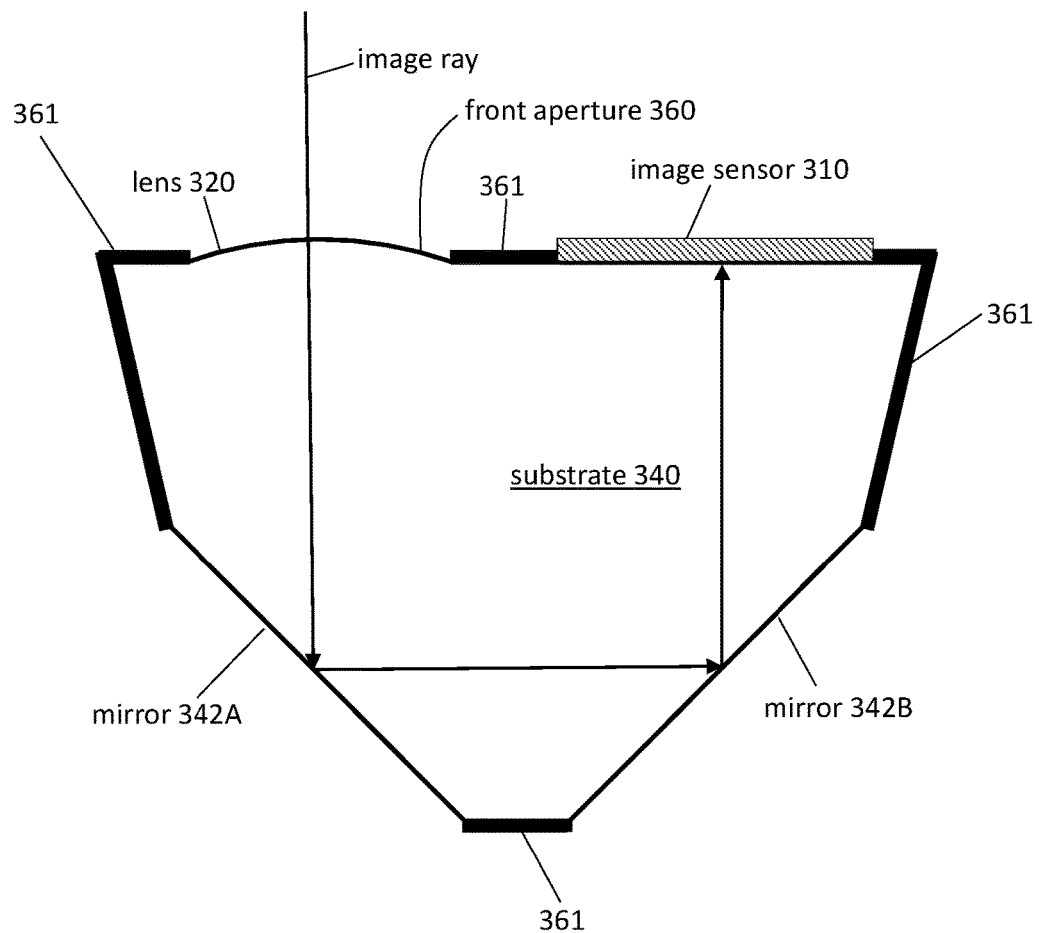
FIG. 3 shows a cross sectional view of a femtocamera using a single convex lens.
Figure 4:
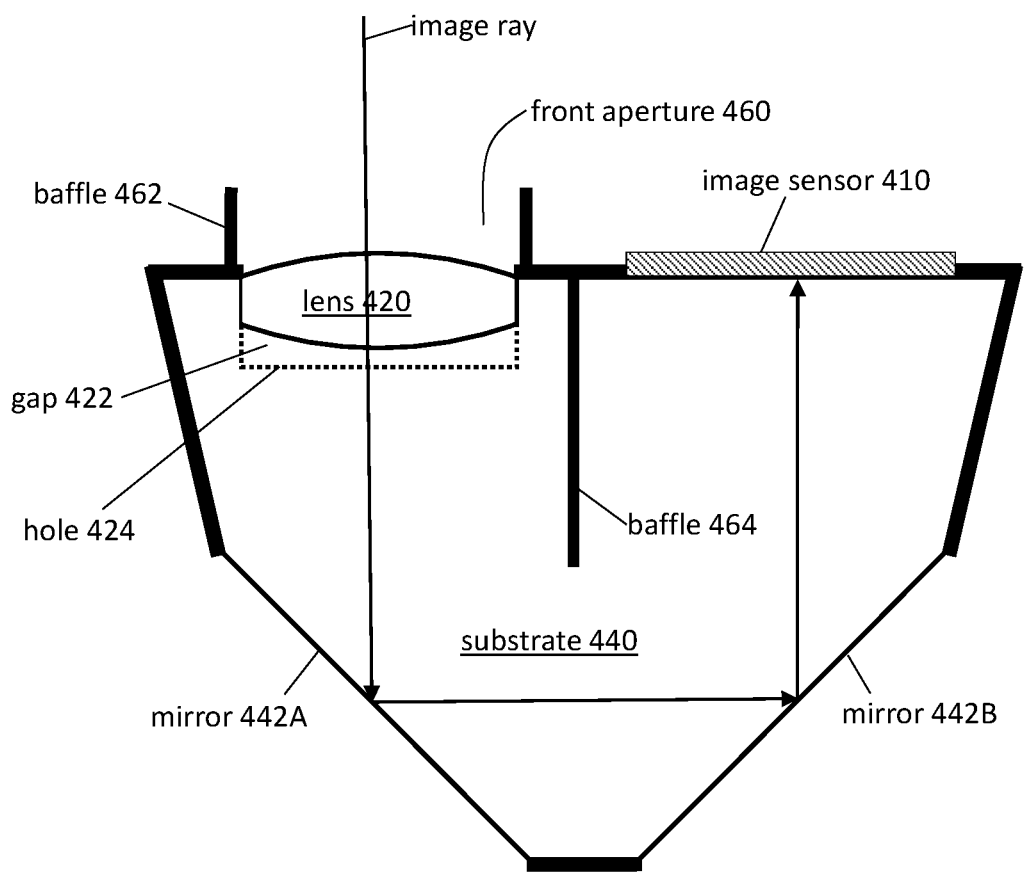
FIG. 4 shows a cross sectional view of a femtocamera using a bi-convex lens.

FIGS. 2-4 show some example femtocamera designs. FIGS. 2A and 2B show a cross sectional view and a perspective view of a femtocamera using two mirrors. The femtocamera of FIG. 2 includes a solid, transparent substrate 240. The solid transparent substrate 240 may be made from plastic, glass or other transparent materials. The femtocamera also includes a concave primary mirror 220 and a convex secondary mirror 230. Either or both of these may be aspheric. The concave primary mirror 220 may be formed by coating an end of the substrate 240 with a reflective material such as a metal (e.g. aluminum or silver) or an engineered stack of dielectric layers. The shape of the primary mirror 220 may be made by any of several different techniques. For example, if the substrate is injection-molded plastic, then the shape of the primary mirror 220 follows the shape of the mold used. Alternatively, the shape of the primary mirror 220 may be made by diamond turning the substrate on a lathe. Or, the shape of the primary mirror 220 may be made by photolithography and etching steps. Gray scale photolithography may be used to etch a mirror surface profile, for example. Wafer scale optics techniques including embossing, compression molding and/or UV curing photosensitive polymers may also be used to form mirror profiles. Additive manufacturing or three-dimensional printing (e.g. via two-photon polymerization) techniques may also be employed. These techniques may also be used to form the secondary mirror 230.

The primary mirror 220 includes a clear, non-reflective mounting area 212. An image sensor 210, such as an array of photodiodes, is mounted at this location. Other types of image sensors include phototransistors, CCDs, pyrometer-based sensors, micro-bolometers, and sensors based on vanadium oxide, silicon, indium phosphide, gallium antimonide or gallium arsenide, for example.

The secondary mirror 230 faces the primary mirror 220, and the image sensor 210 faces the secondary mirror 230. Light rays enter the femtocamera through the front aperture 260. They are first incident on and reflected by the primary mirror 220. The reflected rays are then incident on and further reflected by the secondary mirror 230 before reaching the image sensor 210. The primary mirror 220 and secondary mirror 230 cooperate to form an image of the external environment, which is captured by the image sensor 210.

The system optionally also includes a light baffle system to block or at least reduce extraneous light. In FIG. 2A, the baffle system includes an obscuration 282 and sidewalls 284 (or other types of side baffles). The baffles may be absorbing. The absorbing sidewall baffle 284 is external to the primary mirror 220. The sidewalls 284 may border the external edge of the primary mirror 220 and extend axially to form a cylindrical absorbing structure. They may be either an integral part of the femtocamera optics or a surrounding structure in which the optics is mounted. The sidewall baffle 284 blocks extraneous rays from the external environment that are propagating at oblique angles (e.g., rays that would enter the substrate 240 through its sides if there were no sidewall baffle 284) from reaching the image sensor 210.

In this example, the obscuration 282 is an annular, absorbing ring that surrounds the secondary mirror 230. It may be made by depositing an absorbing material such as black indium tin oxide, carbon, roughened or etched nickel ("nickel black"), black chrome, or Vantablack (Surrey Nano-Systems, Newhaven, UK) around the secondary mirror 230. The obscuration 282 is part of a light baffle system to control extraneous light from the external environment. It may also be used to control or enhance depth of focus.

FIG. 2B shows a perspective view of the femtocamera. The figure shows a transparent substrate 240 with primary mirror 220 and secondary mirror 230 formed on opposite ends, and a clear mounting area 212 in the primary mirror for an image sensor. An optional flat 286 on the circumference of the cylindrical substrate is also illustrated.

The design of femtocameras is complicated by constraints such as the very small volume in which the system must fit, refractive indices of the substrate and the surrounding contact lens material, and required optical magnification specifications. The size and curvature of the primary and secondary mirrors, the size of the image sensor, and the indices of refraction are all examples of parameters that may be adjusted by an optical designer to optimize different design priorities such as optical throughput, depth of focus, field of view, magnification and resolution.

In some designs, the image sensor 210 is not more than 500 microns wide. For example, the image sensor 210 may be a 500×500 array of sensors, with a sensor-to-sensor pitch of not more than 3 microns and preferably not more than 1 micron. A 500×500 array with 1 micron pitch is approximately 500 microns on a side. An array with 500×500 color pixels using a Bayer pattern is less than 1 mm on a side using 1 micron pitch individual sensors (with three or more individual sensors per color pixel). Image sensors may be other sizes. For example, infrared sensors may be significantly larger. Sensor-to-sensor pitches of 10, 20 or even 40 microns are possible.

Some designs may have a narrow field of view, such as 2 degrees or less. Other designs may have a much wider field of view, including up to 150 or even 180 degrees for fish-eye designs. The two-mirror design shown in FIG. 2 is suited for narrower fields of view (for example, in the range of 5 to 15 degrees) and correspondingly higher resolutions. Larger and smaller fields of view are also possible with the two-mirror design.

FIG. 3 shows a cross sectional view of a different femtocamera design using a single convex lens. The femtocamera of FIG. 3 includes a solid, transparent substrate 340, which may be made from plastic, glass or other transparent materials. The optics for the femtocamera includes a single convex lens 320, which in this case is a curved surface on one side of the substrate 340. Two turning mirrors 342A and 342B are located on the opposite side of the substrate 340. The image sensor 310 is mounted on the same side of the substrate 340 as the lens surface 320. The two turning mirrors 342 turn the optical path by 180 degrees so that the image sensor 310 faces towards the user's eye. The folding increases the total length of the optical path compared to an unfolded optical path. By folding the optical path, the physical length of the optical path may be made greater than the thickness of the contact lens. It also reduces extraneous light reaching the image sensor 310.

Lens 320 forms an image of the external environment on the image sensor 310. It typically also defines the front aperture 360 of the femtocamera. The lens 320 may be aspheric. The shape of the lens surface 320 may be made by any of several different techniques. For example, if the substrate is injection-molded plastic, then the shape of the convex lens 320 follows the shape of the mold used. Or, the shape may be made by photolithography and etching steps. Gray scale photolithography may be used to etch the lens profile, for example. Wafer scale optics techniques including embossing, compression molding and/or UV curing photosensitive polymers may also be used to form lens profiles. Additive manufacturing or three-dimensional printing (e.g. via two-photon polymerization) techniques may also be employed. The lens 320 may also be a separate piece that is first shaped and then attached to the rest of the substrate 340.

The turning mirrors 342A,B may be formed by coating the surfaces of the substrate 340 with a reflective material such as a metal (e.g. aluminum or silver) or an engineered stack of dielectric layers. In some geometries, the turning mirrors 342 may be based on total internal reflection. The turning mirrors may be flat, but they may be curved or other shapes in order to introduce optical power or aberration correction. Other surfaces 361 of the substrate 340 may be coated with an absorbing or reflective material in order to reduce extraneous light entering the substrate. Orienting the image sensor 310 towards the user's eye and away from the external environment also helps to reduce extraneous light.

FIG. 4 shows a cross sectional view of a femtocamera using a bi-convex lens. Similar to the femtocamera in FIG. 3, this femtocamera also includes a transparent substrate 440, a single lens 420, two turning mirrors 442A,B and an image sensor 410. However, the lens 420 is a bi-convex lens. The substrate 440 contains a hole or depression 424, into which the lens 420 is inserted. The resulting gap 422 may be a vacuum or it may be filled with nitrogen, air or another gas. It may also be filled with some other material. The gap 422 allows both surfaces of the lens 420 to introduce optical power.

The femtocamera may also include some baffling 462, 464 in addition to the absorbing surfaces shown in FIG. 3. Baffle 462 is a cylindrical tube which narrows the acceptance angle of the front aperture 460 to reduce extraneous light entering the optics. Baffle 464 reduces crossover light between the left side of the optical path (downwards from the lens 420) and the right side of the optical path (upwards towards the image sensor 410). The baffle 464 can be created by cutting a slit or groove between the two sides of the optical path, which may be filled with an opaque or absorbing material.

The femtocamera designs in FIGS. 3 and 4 may have a full field of view of approximately 20 degrees. In one design of FIG. 3, the lens 320 and image sensor 310 are both approximately 200 microns wide. The entire optical system is approximately 600×400×280 microns. The optical resolution may support pixels as small as 1 micron. These lens-based designs are better-suited for wider fields of view, but possibly with lower resolutions.

The specific design of the femtocamera depends on the application. The mirror-based designs described above generally provide narrower fields of view and higher resolutions than the lens-based designs described above. For non-imaging applications, the actual resolution may be lower than would be used for imaging applications. For example, a femtocamera with a small number (e.g., 10×10 array) of relatively large pixels may be used as a sensor for eye tracking applications. The femtocamera may view a far-away object, or a closer reference object such as the user's nose. As another example, the femtocamera may detect when the user is staring by sensing that the captured images are not changing much.

The designs shown in FIGS. 2-4 all utilize a folded optical path. As a result, the optics have an optical path that is longer than the thickness of the contact lens. This can result in lower aberrations and higher angular resolutions. The optical path allows the image sensor to be oriented approximately parallel to, rather than perpendicular to, the contact lens surfaces. The femtocamera may occupy not more than 1 to 2 mm of vertical space (i.e., contact lens thickness) and/or the femtocamera may have a lateral footprint of not more than 2 to 4 mm$^2$. The entrance aperture may have a maximum lateral dimension of not more than 1 to 2 mm.

The specific geometries shown in FIGS. 2-4 result in femtocameras that can be inserted into the contact lens through an outward-facing surface, although this is not a requirement. A hole can be formed in the outward-facing surface with the shape of the femtocameras of FIG. 2, 3 or 4, and the femtocamera can then be installed into the hole. Often, it is more convenient to provide access through the outer surface 112 of the contact lens (or other outward-facing surface), rather than through the inner surface 114 (see FIG. 1A).

Figure 5:
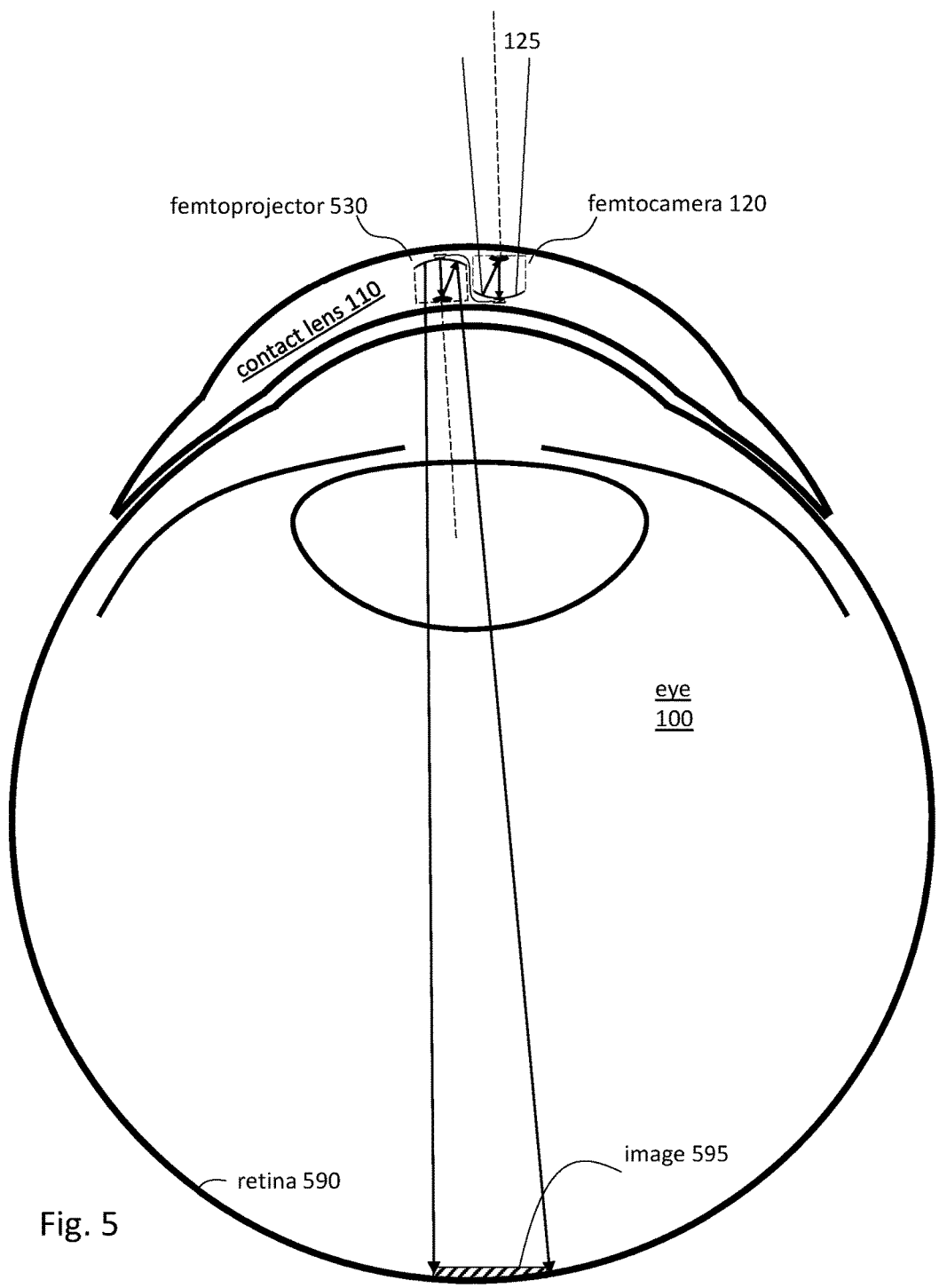
FIG. 5 shows a cross sectional view of an eye-mounted device with a femtocamera and a femtoprojector.

In addition to capturing images of the external environment or providing eye tracking functionality, femtocameras can also be used for other applications in different types of eye-mounted devices. For example, FIG. 5 shows a cross sectional view of an eye-mounted device with a femtocamera 120 and a femtoprojector 530 (i.e., a small projector also contained in the contact lens 110). The femtocamera 120 captures images with its field of view 125. The femtoprojector 530 projects images 595 onto the retina 590 of the user. These two can be coordinated so that the images captured by the femtocamera are used to determine the images 595 projected by the femtoprojector 530.

FIGS. 6-13 show additional variations of the femtocamera optical system of FIG. 3. These variations involve internal refractive interfaces, obscuration position and shape, and other parameters. The design choices are necessarily illustrated in combinations and, to keep the number of figures under control, not every possible combination is shown. For example, the choice of shape of internal refractive interface is largely independent of the choice of obscuration location or obscuration shape. Some combinations of those choices are illustrated. Those skilled in the art will appreciate that other, unillustrated combinations may be desirable in certain situations.

Figure 6:
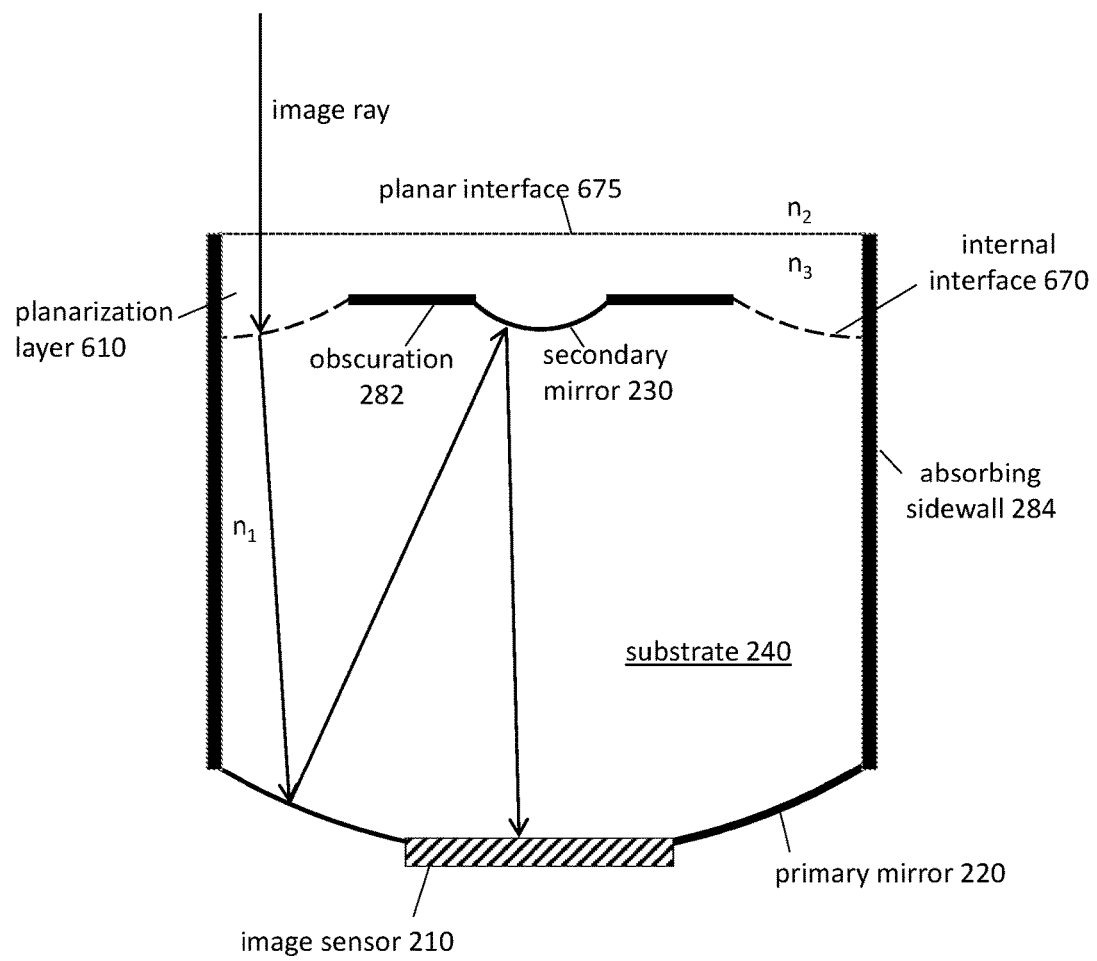
FIGS. 6-10 show cross sectional views of various femtocamera optical systems.

In FIG. 6, image rays first cross a boundary 675 between index $n_2$ (contact lens) surroundings and index $n_3$ material and then cross a boundary 670 between index $n_3$ material and index $n_1$ material in the femtocamera optical system. They are then incident on the primary mirror 220. These boundaries (and any boundary between one transparent medium and another) are called "refractive interfaces." Refractive interfaces may be curved, flat or have more complicated shapes.

In FIG. 6, and in other examples described below, the internal refractive interface 670 between $n_1$ and $n_3$ may be curved or flat, while the external refractive interface 675 between $n_3$ and $n_2$ preferably is flat. The $n_3$ material is therefore sometimes referred to as a planarization layer 610. It provides a planar interface 675 between the femtocamera optical system and its surroundings. The profile of the refractive interface between $n_1$ and $n_3$ allows an optical designer to make adjustments to the performance of the optical system. In FIG. 6, the internal interface 670 is curved. The value of indices $n_1$ and $n_3$, and the shape of the boundary between them, affect projected image quality. However, the planar interface 675 between $n_3$ and $n_2$ makes the system relatively insensitive to small changes in $n_2$.

Figure 7:
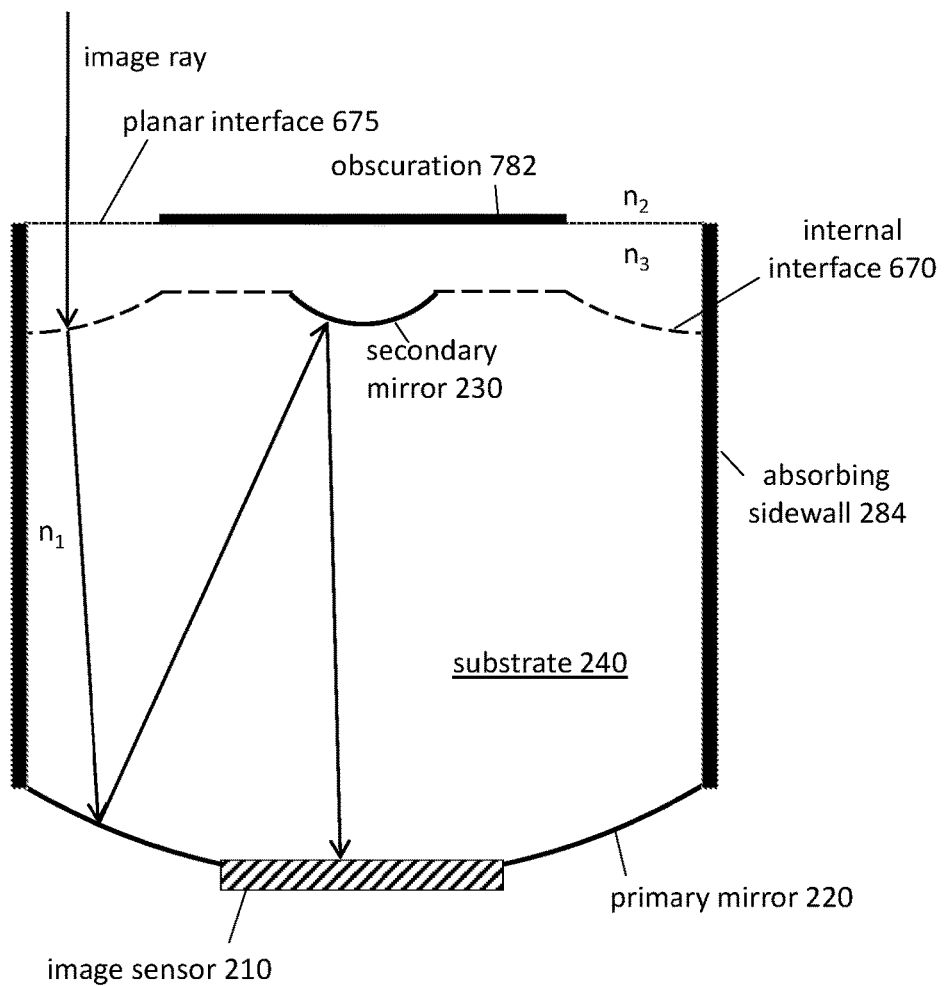

The femtocamera optical system of FIG. 7 is similar to that of FIG. 6. However, in FIG. 7 the obscuration 782 is placed on the surface of the planar refractive interface 675, rather than surrounding the secondary mirror 230. It is axially offset from the secondary mirror 230. In FIG. 7 the obscuration 782 physically covers a circular area, although optically it has similar effect as an annular obscuration. Preference for the design of FIG. 7 versus that of FIG. 6 is driven in part by manufacturing techniques. Applying an obscuration material 782 to the planar refractive interface 675 may be preferable to forming a planarization layer over an obscuration material located on the internal interface 670, for example. Furthermore, a reflective layer may be formed over the obscuration 782 (e.g. deposited after the obscuration) to reflect any light that passes through the obscuration back through its absorptive layer.

Figure 8:
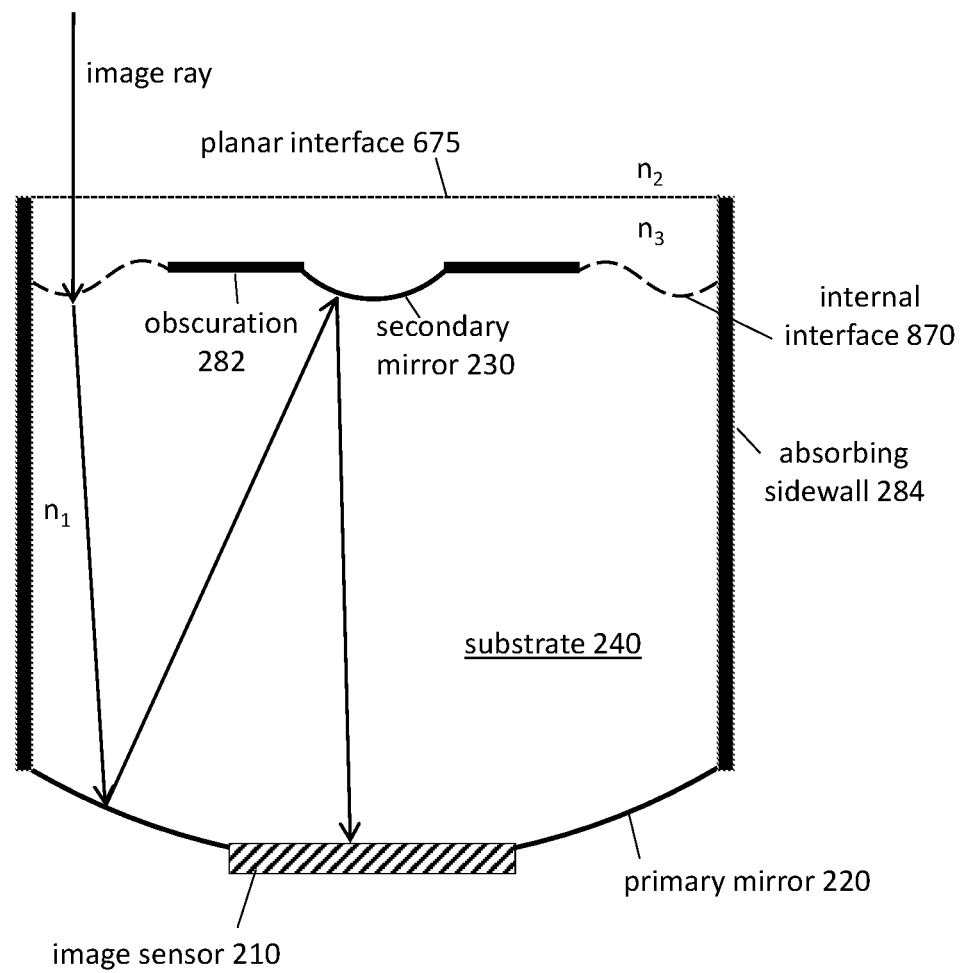

In the femtocamera optical system of FIG. 8, the internal refractive interface 870 between index $n_1$ material and index $n_3$ material has a more complex, higher order shape. The shape of the internal refractive interface 870 is a design parameter that is used to optimize image quality to a higher level that what is possible via primary and secondary mirror shape alone. The shape of the internal refractive interface 870 may be described by a polynomial expansion in radius with a set of coefficients. Although it is illustrated as being approximately in the same plane as the secondary mirror and the obscuration, the internal refractive interface may be axially displaced either closer to, or farther away from, the primary mirror 220.

Figure 9:
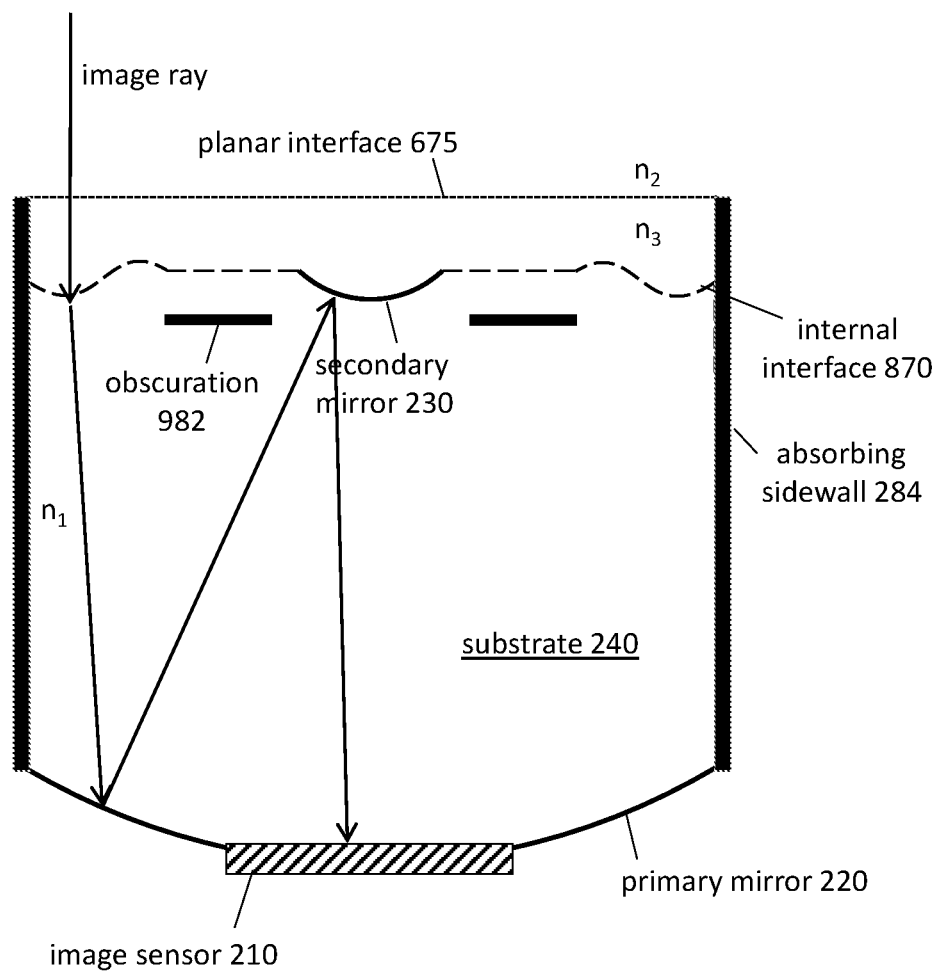

In the femtocamera optical system of FIG. 9, the annular obscuration 982 is axially offset from the secondary mirror 230. It is positioned closer to the primary mirror 220 than is the secondary mirror 230. Preference for this placement of the obscuration is mainly driven by manufacturing techniques rather than optical performance. Forming an obscuration in the middle of the solid transparent substrate is convenient in some manufacturing process flows described below.

Figure 10:
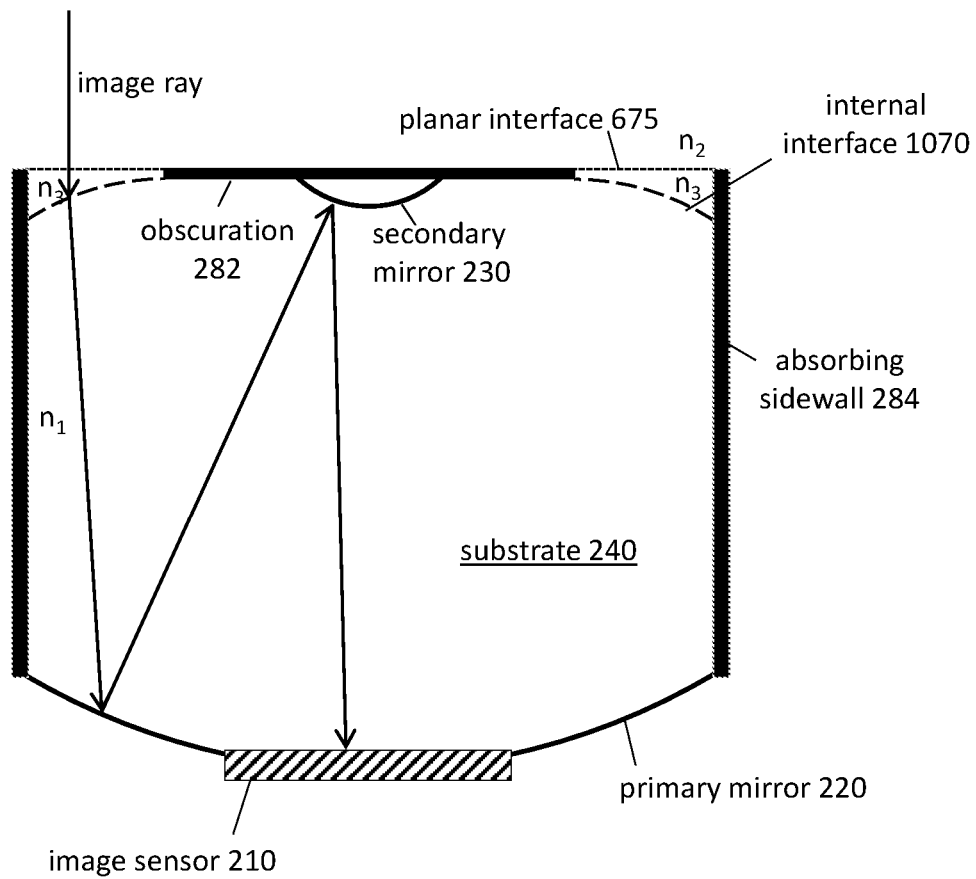

FIG. 10 shows a femtocamera optical system with an internal refractive interface 1070 curved opposite to that of FIG. 6. Conceptually the choice of convex, concave or complex curved refractive interface 1070 may be thought of as being determined by whether a positive, negative or more complicated correction to the optical effects of the primary and secondary mirrors is desired. The system of FIG. 10 also has a planar refractive interface formed coplanar (or nearly so) with an obscuration 282 and secondary mirror 230. Preference for this arrangement is again mainly a matter of manufacturing choice. The planar refractive interface 675 may be a thin window, for example, and the $n_3$ index material may be a curable or moldable material, or a gas, such as nitrogen or air, or a liquid, such as a liquid crystal.

FIGS. 6-10 illustrate various configurations of internal refractive interface, planar refractive interface and obscuration. The internal refractive interface permits design adjustments to the overall optical system. The planar interface reduces the sensitivity of the optical design to changes in the index $n_2$ of surrounding material such as a contact lens. The obscuration reduces extraneous light from reaching the image sensor.

Figure 11A:
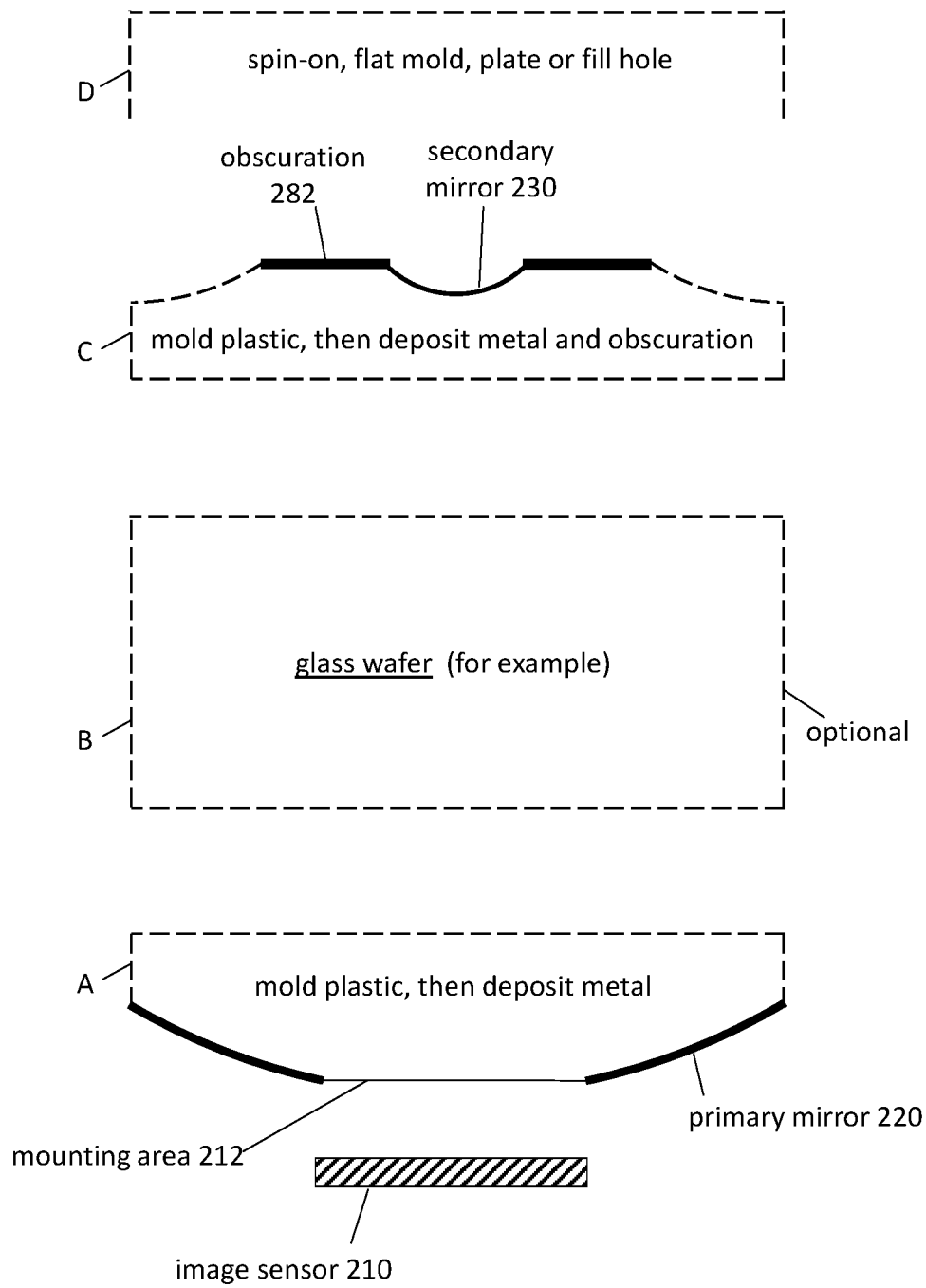
FIGS. 11A-11B show an exploded view and an assembled view of a femtocamera.
Figure 11B:
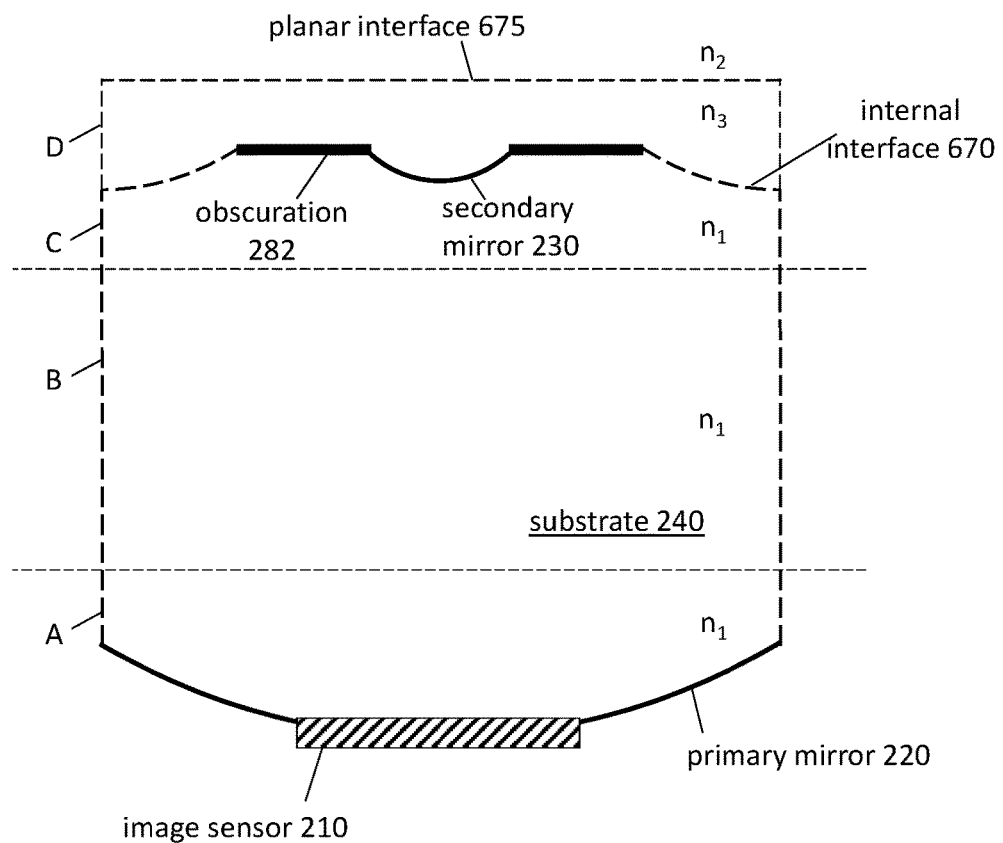

FIGS. 11 and 12 illustrate various methods for fabricating femtocamera optical systems. FIGS. 11A-11B show exploded and assembled views, respectively, of a system like that shown in FIG. 6. FIG. 11A shows an exploded view of a femtocamera optical system in four parts: A, B, C and D.

Part A in FIG. 11A may be molded in plastic and then coated with metal to form a primary mirror structure 220. An image sensor 210 may be integrated onto the mount area 212. Part B may be a glass or plastic wafer. Part B is optional. If it is omitted, Parts A and C may be made thicker to compensate. On the other hand, Part B may be a convenient starting substrate onto which Parts A and C may be formed by stamping moldable plastic. Part C may be made using a process similar to that used for Part A. Metal deposited on Part C forms a secondary mirror 230. An absorbing material deposited on Part C forms an obscuration 282. Finally, Part D, a planarizing layer, may be molded, plated or spun on top of Part C. It may also be created by filling a hole into which the rest of the structure is inserted, or the hole may be left empty or filled with gas. FIG. 11B shows an assembled view of a femtocamera optical system made from Parts A-D.

Figure 12A:
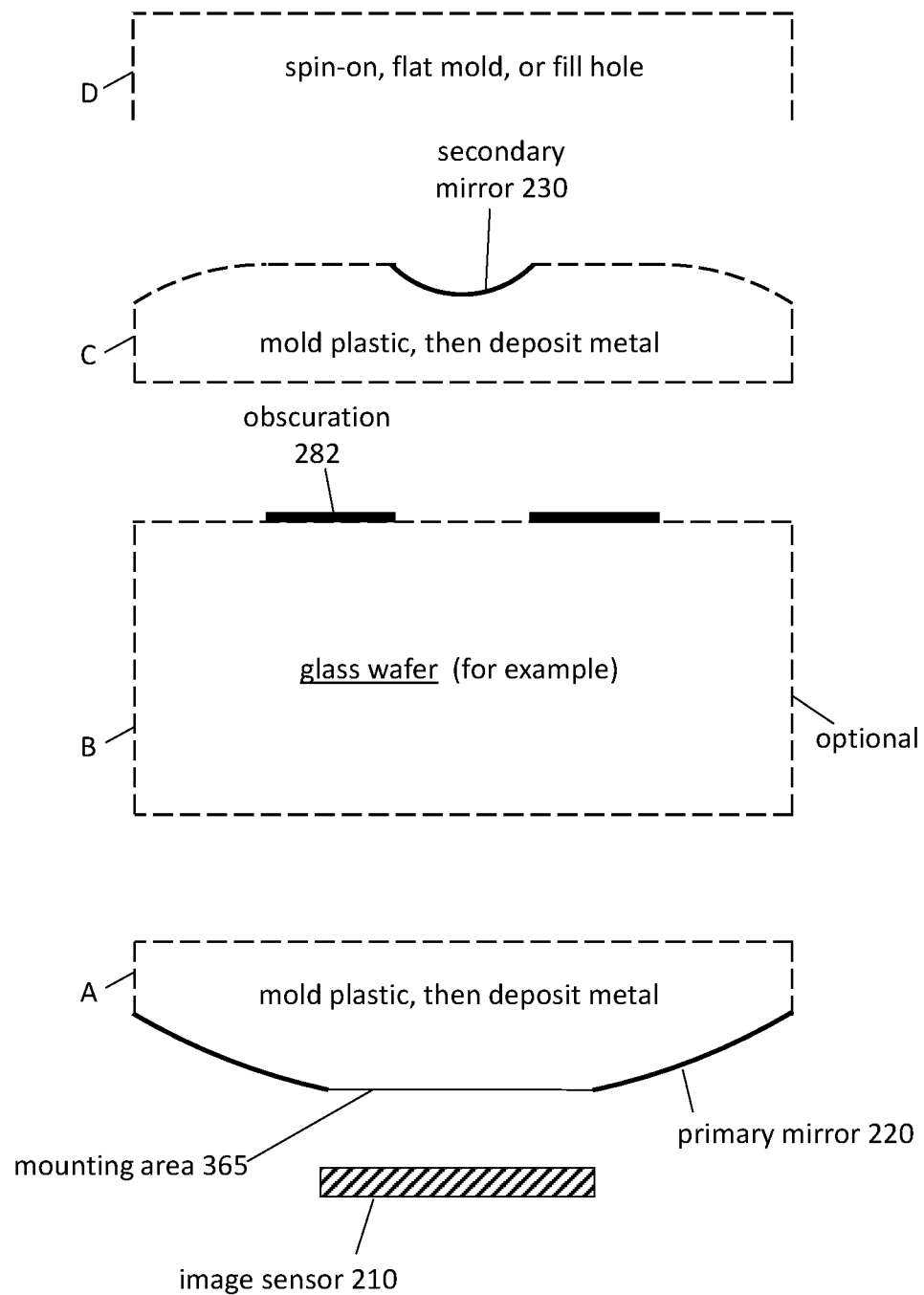
FIGS. 12A-12B show an exploded view and an assembled view of another femtocamera.
Figure 12B:
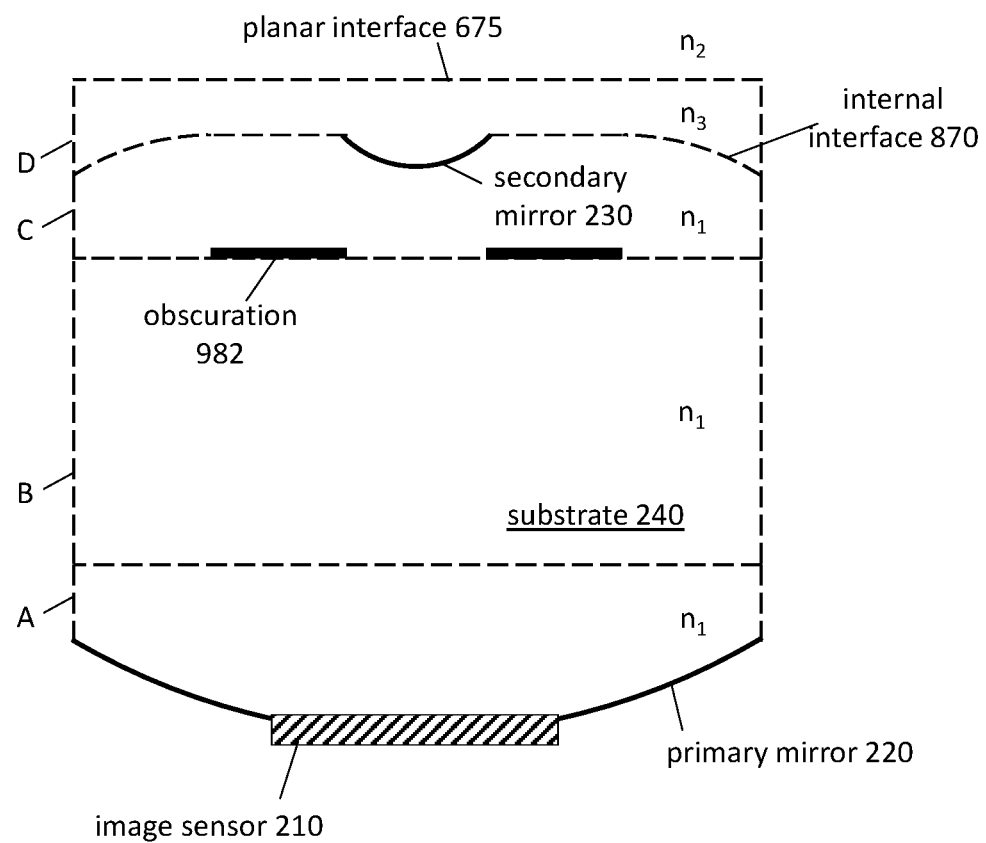

FIGS. 12A-12B show exploded and assembled views, respectively, of a system that is a combination of the systems shown in FIGS. 9 and 10. FIG. 12A shows an exploded view of a femtocamera optical system in four parts: A, B, C and D. These parts may be fabricated using the same techniques described for corresponding parts in FIG. 11. The main differences between FIGS. 11 and 12 are that in FIG. 12A, the obscuration is formed on Part B. This may be done by depositing and patterning an absorbing material on Part B. Also, in FIG. 12A, the internal refractive interface formed between Parts C and D curves the opposite way. Of course a complex curve may have been formed instead. In FIGS. 11 and 12, "Part D" may be formed by a hole drilled in a rigid gas permeable contact lens and filled with an appropriate optical epoxy. FIG. 12B shows an assembled view of a femtocamera optical system made from Parts A-D of FIG. 12A.

Figure 13:
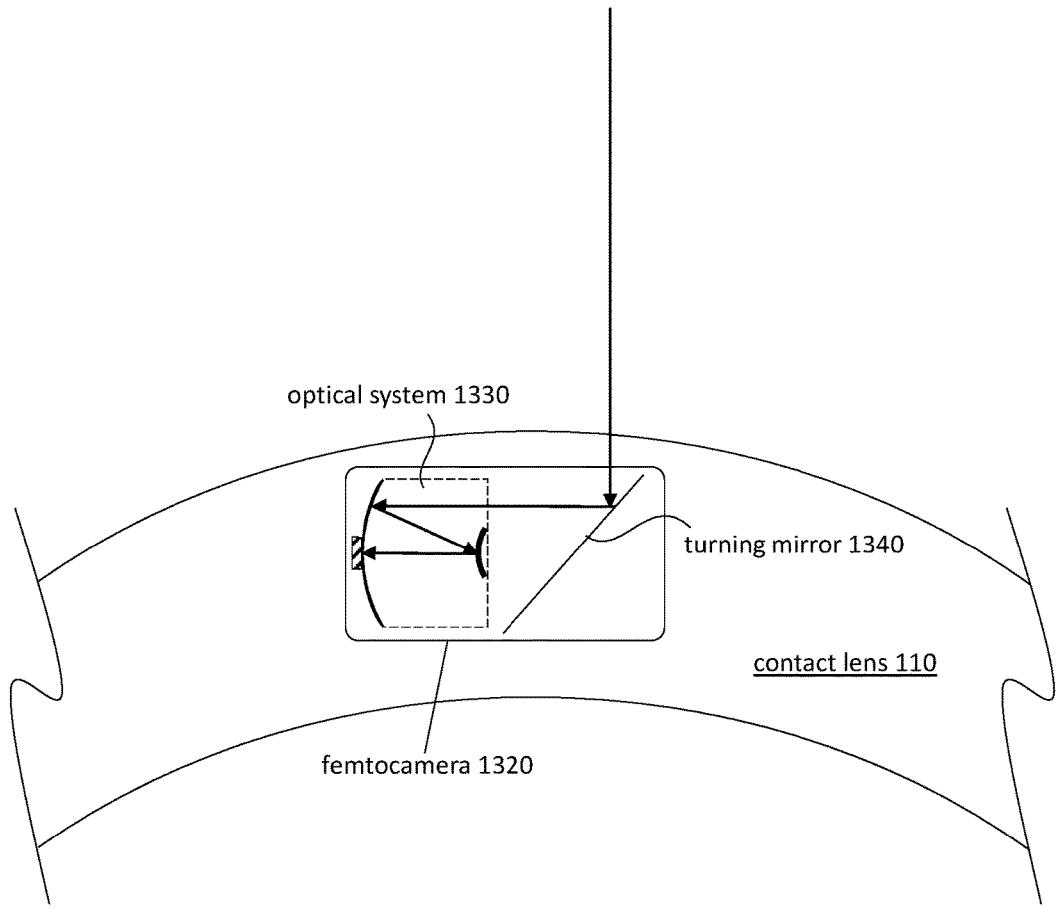
FIG. 13 shows a cross sectional view of a horizontally positioned femtocamera in a contact lens.

In FIG. 1 a femtocamera is shown mounted in a contact lens in a "vertical" configuration. Said another way, the optical axis and/or axis of symmetry of the femtocamera 120 is approximately perpendicular to the outer surface of the contact lens 110. FIG. 13 shows a cross sectional view of a femtocamera in a contact lens. In FIG. 13, the femtocamera 1320 is mounted in a "horizontal" configuration, meaning that the optical axis and/or axis of symmetry of the femtocamera optical system 1330 is approximately parallel to the outer surface of the contact lens 110. In this configuration, a turning mirror 1340 directs image rays from the external environment to the femtocamera optical system 1330.

Figure 14:
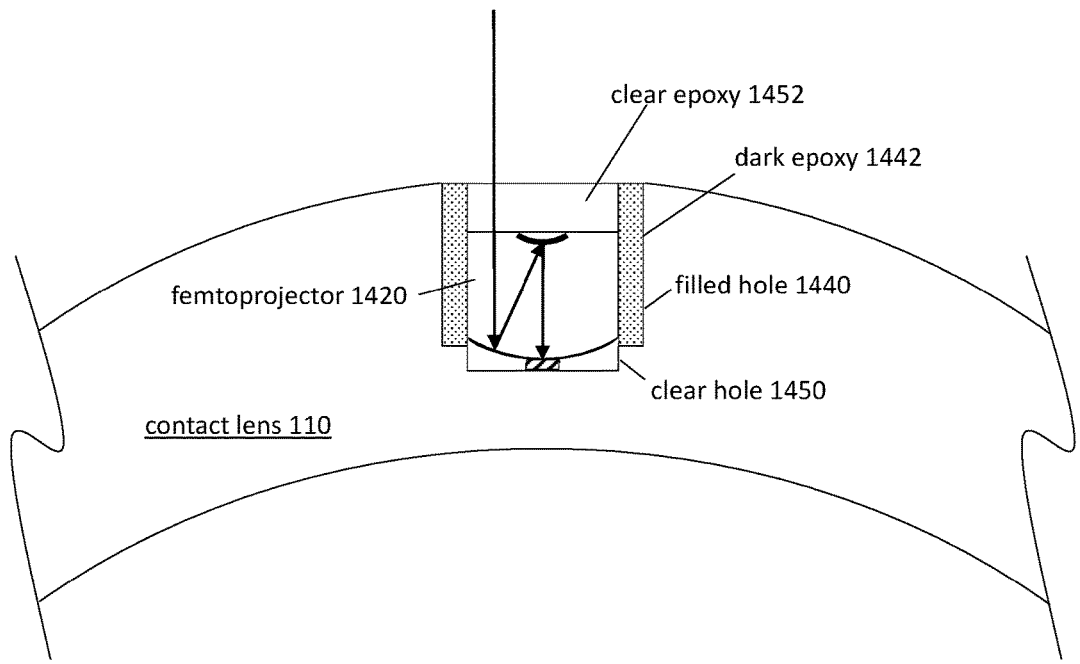
FIG. 14 shows a cross sectional view of yet another femtocamera in a contact lens.

FIG. 14 shows a cross sectional view of yet another femtocamera 1420 in a contact lens 110. The assembly of FIG. 14 is made as follows. A first hole 1440 is drilled (or otherwise created) in a contact lens 110, such as a rigid gas permeable lens. Next, the hole 1440 is filled with dark colored epoxy 1442 (Master Bond EP42HT-2MED Black, for example). This is the filled hole 1442. Next, another hole 1450, concentric with the first but smaller diameter and deeper, is drilled or otherwise created. A femtocamera 1420 is inserted into this hole 1450. Clear, index-matched epoxy 1452 may be used to fill the top of hole 1450. The dark colored epoxy 1442 left from the filled hole operation serves as the absorbing sidewall for the femtocamera as illustrated above. The top of hole 1450 may be filled with clear epoxy 1452 and may form Part D of FIGS. 11-12. This assembly method may be referred to as "drill-fill-drill". Materials other than epoxy can be used, and the first hole 1440 need not be filled. Its sides may be coated instead, for example.

FIGS. 15-22 illustrate additional femtocamera optical system designs including, among other things, different structures for controlling extraneous light.

Figure 15:
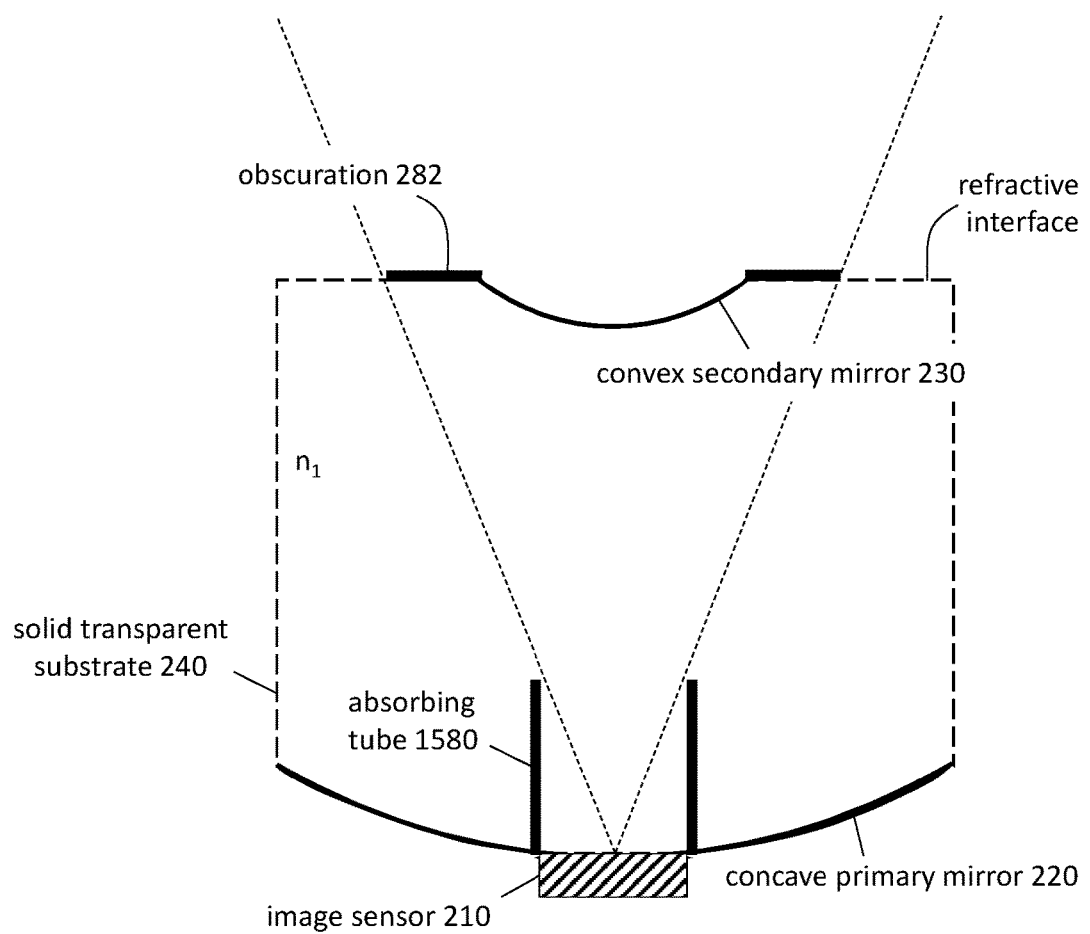
FIGS. 15-17 show cross sectional views of femtocamera optical systems with different types of sensor baffles.

FIG. 15 shows a femtocamera optical system with an annular obscuration 282 and an internal absorbing tube 1580. The internal absorbing tube 1580 is shown in cross-section in FIG. 15, but in three dimensions it is an empty cylinder with light absorbing walls. The tube may also have a rectangular or other shape cross-section to match the shape of the image sensor 210. The absorbing tube 1580 blocks rays from entering the image sensor 210 without first being reflected by the primary mirror 220 and second mirror 230. As such, it is part of the light baffle system. It reduces the acceptance angle of the image sensor 210, as shown by the two dashed lines, and therefore may be referred to as a sensor baffle. If the acceptance angle is sufficiently reduced, then side baffles may not be required. The absorbing tube 1580 may be machined in a solid transparent substrate by diamond turning. Alternatively, the absorbing tube 1580 may be hot pressed into the solid transparent substrate. The cylindrical cut thus formed may then be filled with an absorbing material such as carbon, roughened nickel, Vantablack, black indium tin oxide, etc.

Alternatively, a substrate with a narrow, cylindrical end having the size of the desired tube 1580 may be made first. Then the cylindrical end may be coated with an absorbing material such as carbon, roughened nickel, Vantablack, etc. to form a tube 1580. Finally, transparent material may be added around the absorbing tube 1580 to complete the transparent substrate as shown in the figure.

Figure 16:
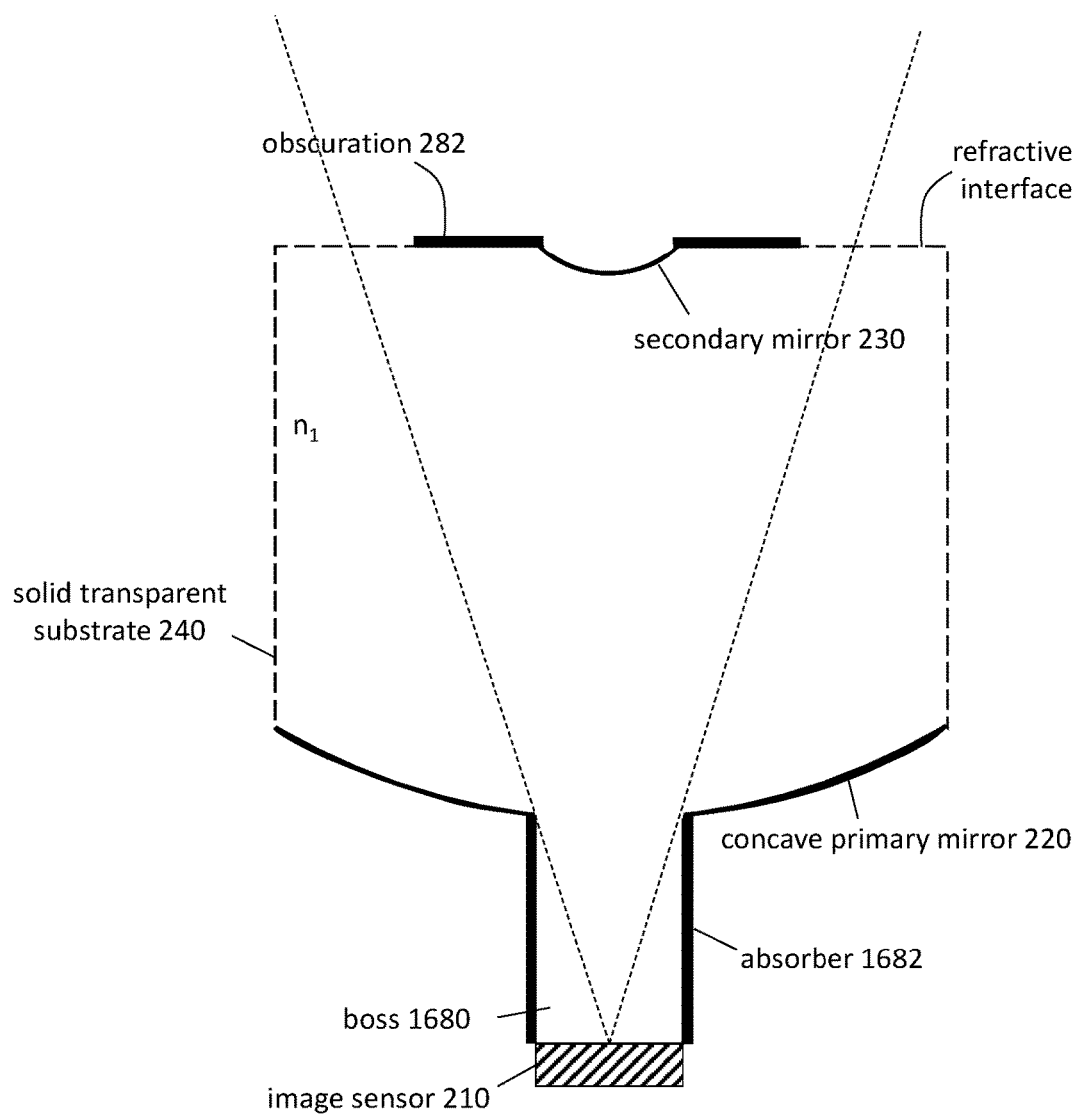

FIG. 16 shows a femtocamera optical system with an annular obscuration 282 and displaced image sensor 210. The system of FIG. 16 includes a "boss" 1680 to support a displaced image sensor, and an absorber 1682 surrounding the boss.

The boss 1680 is shown in cross-section in FIG. 16, but in three dimensions it is a solid cylinder with a light absorbing sidewall 1682. The absorber 1682 blocks rays from entering the image sensor 210 without first being reflected by the primary and secondary mirrors. The absorber 1682 is another type of sensor baffle.

Starting from a solid, transparent substrate, a boss 1680 may be made in one end of the substrate as shown in the figure by turning on a lathe. Alternatively, the boss 1680 may be a feature in a mold in an injection molding process. The boss 1680 may be coated with an absorbing material such as carbon, roughened nickel, Vantablack, black indium tin oxide, etc.

Figure 17:
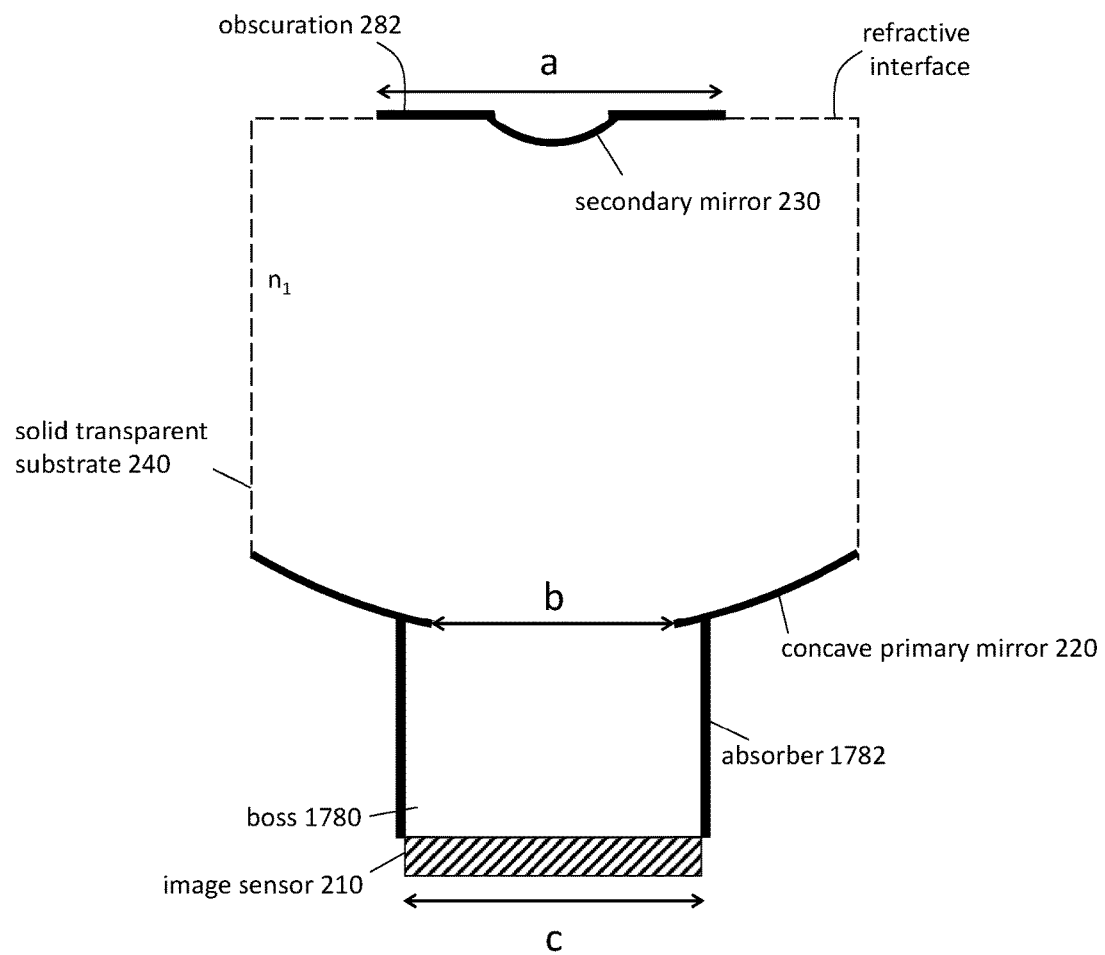

FIG. 17 shows a femtocamera optical system with an annular obscuration 282 and displaced image sensor 210 that is larger than an opening in the primary mirror. The system of FIG. 17 is similar to that of FIG. 16. However, in FIG. 17 the size "c" of the image sensor 210 is greater than the size "b" of the clear opening in the primary mirror 220. The size "a" of the obscuration 282 is also greater than "b". Briefly, a>b and c>b. Also, a≤c is acceptable as long as a>b.

The boss 1780 in FIG. 17 includes a light absorbing sidewall 1782. It may be made by any of the methods described for fabricating the boss shown in FIG. 16. However, additional steps may be necessary to make the structure of FIG. 17 because the boss 1780 is larger than the size of the clear opening in the primary mirror 220. The boss 1780 may be tapered, by diamond turning for example, such that the diameter of the boss varies from "c" at the image sensor 210 to "b" at the primary mirror 220. That way the substrate is exposed so that reflective material may be deposited to form the entire primary mirror surface 220.

Figure 18:
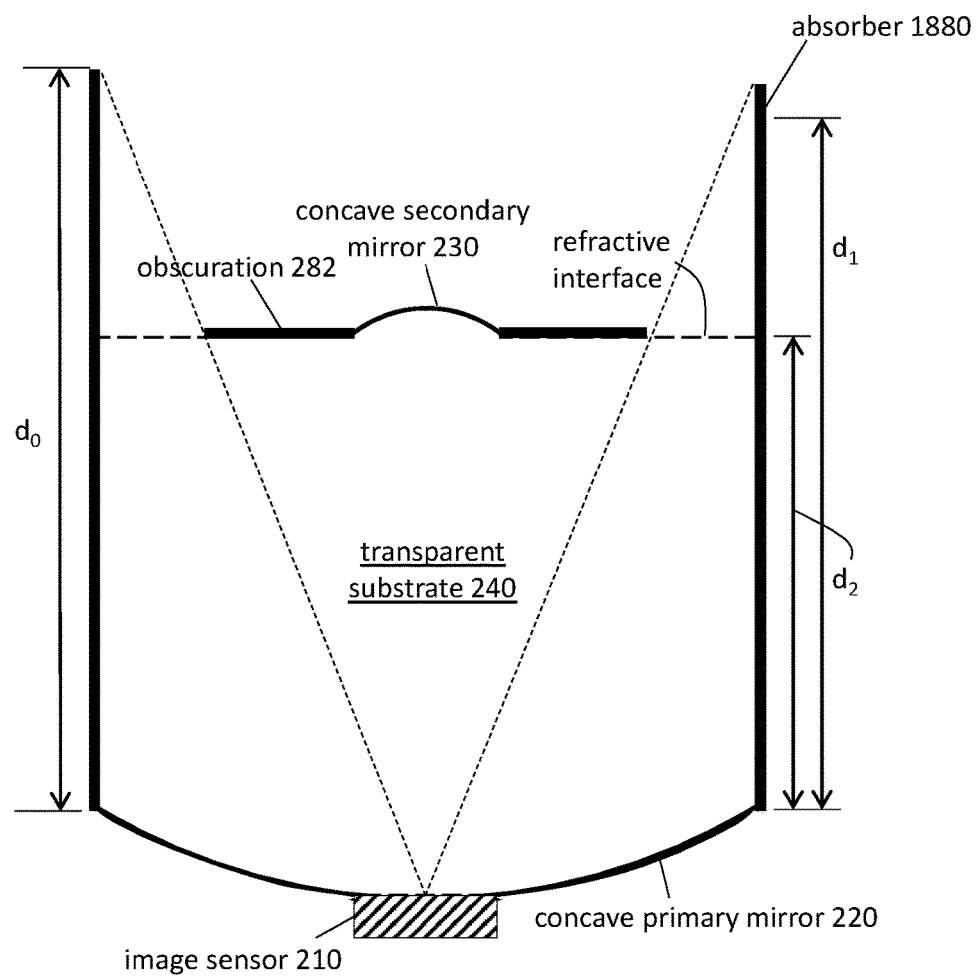
FIG. 18 shows a cross sectional view of a femtocamera optical system with an extended side baffle.

FIG. 18 shows a femtocamera optical system with an annular obscuration 282, an external absorbing tube 1880, and a concave secondary mirror 230. The external absorbing tube 1880 extends beyond the refractive interface. In the figure, the tube 1880 has a length do that prevents some extraneous rays from directly reaching the image sensor 210.

Design constraints on the overall size of the optical system may preclude the use of an external absorbing tube that is as long as needed to block every stray ray. It may only be possible to make a tube as long as $d_1$ or $d_2$, for example. A shortened, external tube is still useful in that it blocks some stray rays.

Figure 19:
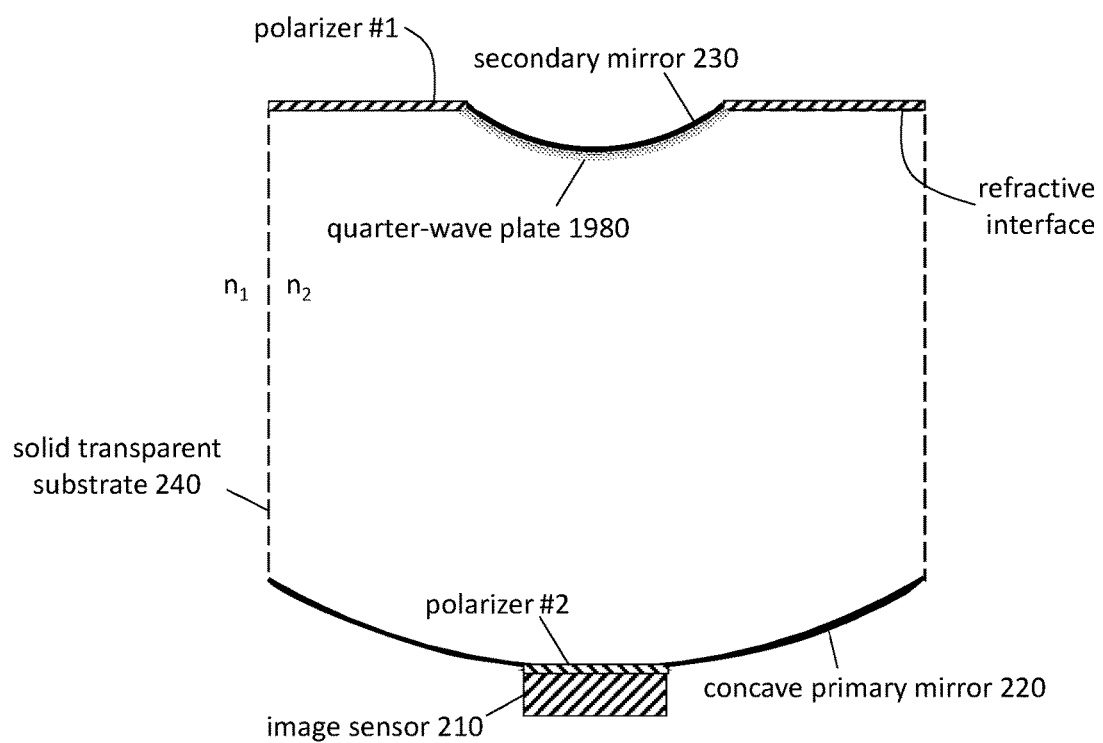
FIG. 19 shows a cross sectional view of a femtocamera optical system including a polarization-based system.

FIG. 19 shows a femtocamera optical system including a polarization-based system. In the system of FIG. 19, light rays entering the optical system first pass through linear polarizer #1. Some of those rays then pass through an optical quarter wave plate 1980, are reflected by the secondary mirror 230 and pass through the optical quarter wave plate again. After that, the rays pass through linear polarizer #2 to the image sensor 210.

Linear polarizer #2 is polarized perpendicular to linear polarizer #1. Light that passes through the quarter wave plate, is reflected, and passes through the quarter wave plate again has its polarization rotated by 90 degrees and therefore passes through linear polarizer #2. Light that is not reflected by the secondary mirror 230, and therefore does not pass through the quarter wave plate before and after, does not have its polarization rotated. That light is blocked by polarizer #2 since the light is polarized perpendicular to the polarization of the polarizer. Thus, the polarizer #2 blocks extraneous light.

In an alternate approach, the quarter-wave plate 1980 may be located on the concave primary mirror 220 instead. So long as image rays and stray rays are have different polarizations when they reach polarizer #2, the stray rays can be blocked by a polarization filter.

The polarizers and the optical quarter wave plate may be made from optical coatings. See, e.g. "Design and preparation of quarter-wave plate coatings", Gu Peifu, Tangjinfa (National Air Intelligence Center, 1995).

Design of any of the femtocamera optical systems described herein is complicated by constraints such as the very small volume in which the system must fit, refractive indices of the substrate and the surrounding contact lens material, required optical magnification specifications, luminous flux required at the retina given a low-power image sensor, and image sharpness and contrast. When dealing with a large set of constraints it is helpful to have several adjustable design parameters. As described above, one example of an adjustable design parameter is mirror curvature. The primary mirror in all femtocamera optical systems is concave, as shown in the figures. The secondary mirror, however, may have positive or negative curvature (i.e. it may be concave or convex) or it may be flat. The size of the secondary mirror is another adjustable parameter. An annular obscuration allows one to adjust the size of the mirror (at least from a light ray blocking perspective) independently of its curvature.

Figure 20:
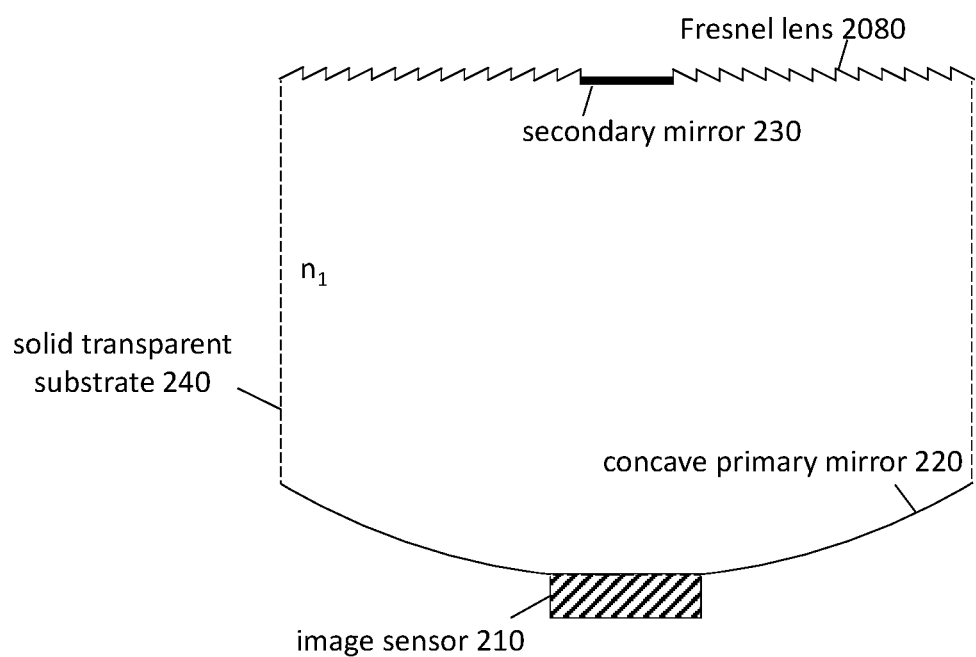
FIG. 20 shows a cross sectional view of a femtocamera optical system with a Fresnel lens interface.
Figure 21:
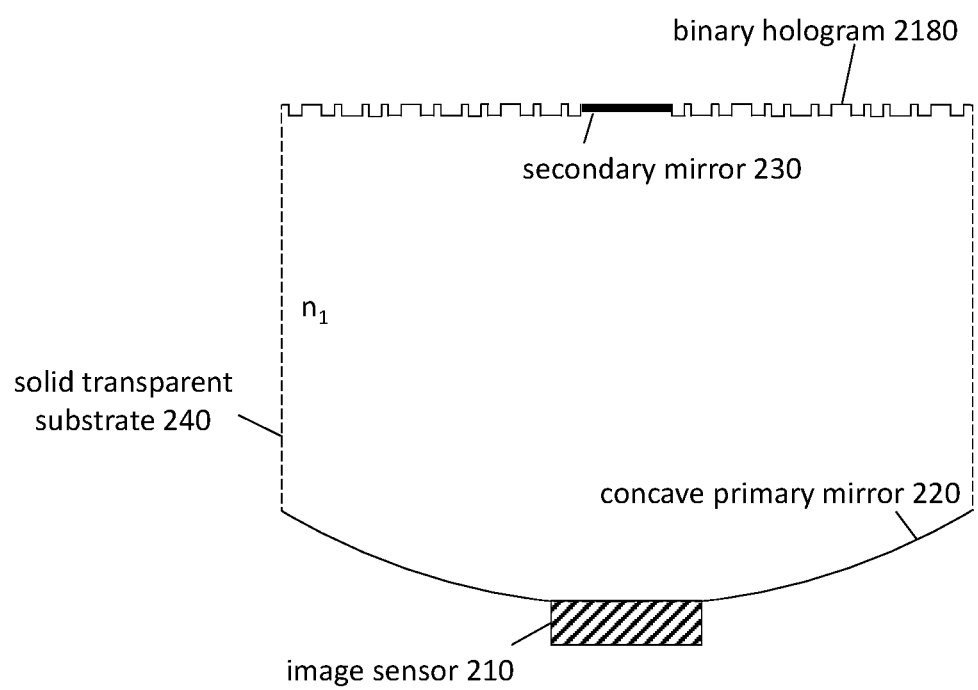
FIG. 21 shows a cross sectional view of a femtocamera optical system with a binary hologram interface.

FIGS. 20-21 show different types of optical interfaces in femtocamera optical systems. Any of these systems may have a concave, convex or flat secondary mirror and any of these systems may include an obscuration.

FIG. 20 shows a femtocamera optical system with a flat secondary mirror 230 and a Fresnel lens interface 2080. FIG. 21 shows a femtocamera optical system with a flat secondary mirror 230 and a diffractive interface 2180 (e.g., a binary hologram lens interface).

The surface profiles of the refractive interfaces in FIGS. 20 and 21 create lenses even though the interfaces are (macroscopically) flat overall. Fresnel lenses or binary holograms may be created on the interface by including their features in a mold in the case of injection molded parts or by turning on a lathe (Fresnel lens) or by photolithography and etching (Fresnel or hologram).

Figure 22:
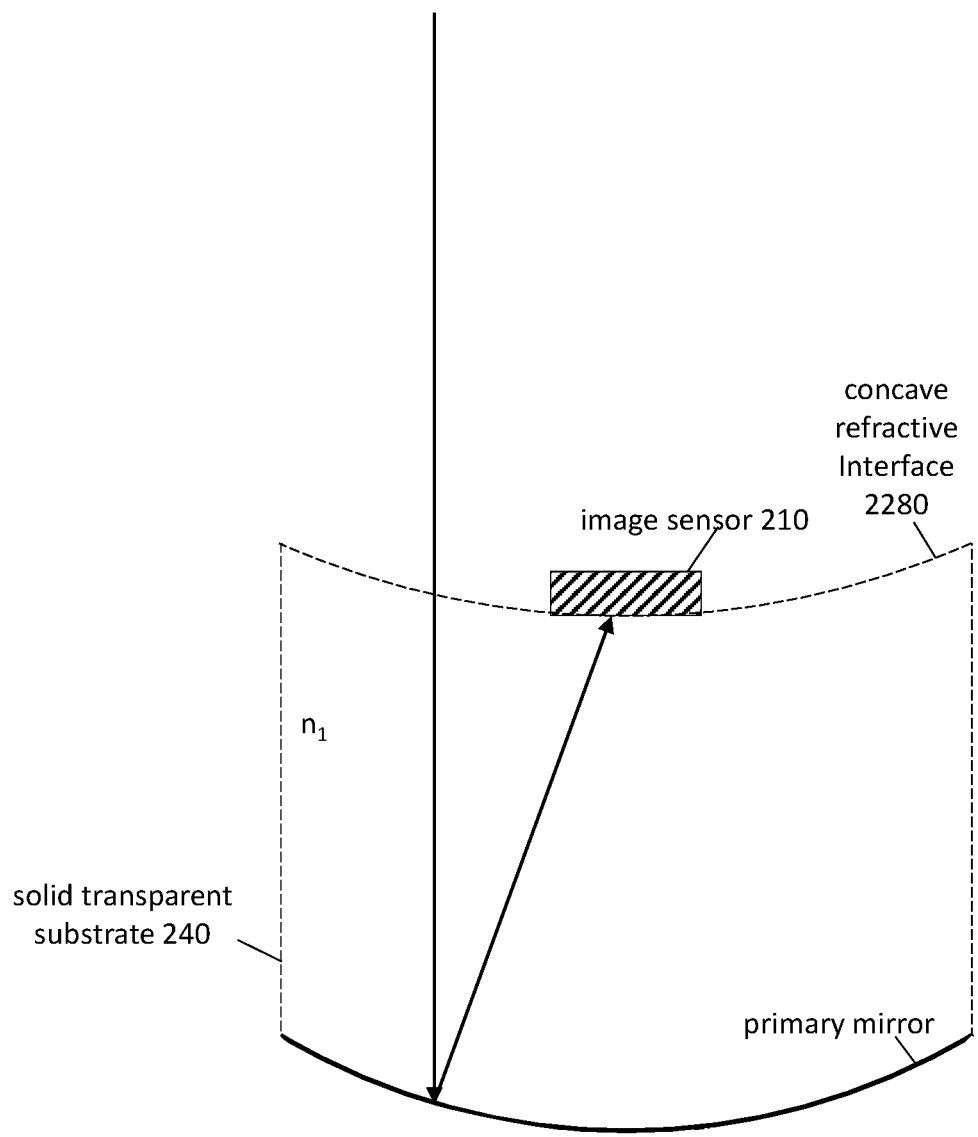
FIG. 22 shows a cross sectional view of a femtocamera optical system with no secondary mirror.

FIG. 22 shows a femtocamera optical system with no secondary mirror. FIG. 22 provides a cross sectional view. In the system of FIG. 22, rays from the external environment enter the optical system through the refractive interface 2280. They are reflected off the primary mirror 220 to the image sensor 210. The image sensor takes the place of the secondary mirror compared to the designs shown previously. In the example of FIG. 22, the refractive interface 2280 is concave, but it may be convex or flat in other designs.

A variety of femtocamera optical systems have been described. Each of them can be made small enough to fit in a contact lens using plastic injection molding, diamond turning, photolithography and etching, or other techniques. Most, but not all, of the systems include a solid cylindrical transparent substrate with a curved primary mirror formed on one end and a secondary mirror formed on the other end. Any of the designs may use light blocking, light-redirecting, absorbing coatings or other types of baffle structures as needed to reduce stray light.

When a femtocamera optical system is described as "cylindrical", its cylindrical shape may include a flat on a sidewall. In other words, the circular cross section of a perfect cylinder is not a requirement, just an overall cylindrical shape. The structure shown in FIG. 2B is cylindrical. Optical systems may also be made from extrusions of other shapes, such as triangles, squares, pentagons, etc.

Although the detailed description contains many specifics, these should not be construed as limiting the scope of the invention but merely as illustrating different examples. It should be appreciated that the scope of the disclosure includes other embodiments not discussed in detail above. For example, the designs in FIGS. 2-4 all use solid substrates, but an air core may also be used. As another example, although the femtocamera is described as embedded in a contact lens, small cameras can also be used in other applications, such as embedded in an eyeglasses lens. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. An eye-mounted device comprising:
 a contact lens; and
 a femtocamera mounted in the contact lens, the femtocamera comprising:
  a front aperture facing away from a user's eye and towards an external environment;
  an image sensor; and
  optics that image the external environment onto the image sensor, where an optical path from the front aperture to the image sensor is a folded optical path.

2. The eye-mounted device of claim 1, further comprising:
 a femtoprojector mounted in the contact lens, the femtoprojector projecting images detected by the femtocamera to the user's retina.

3. The eye-mounted device of claim 1, where a physical length of the optical path is greater than a thickness of the contact lens.

4. The eye-mounted device of claim 1, where the image sensor is oriented parallel to a surface of the contact lens.

5. The eye-mounted device of claim 1, where the femtocamera is not larger than 2 mm×2 mm×2 mm.

6. The eye-mounted device of claim 1, where the femtoprojector optical system has an entrance aperture with a maximum lateral dimension of not more than 1 mm.

7. The eye-mounted device of claim 1, where the optics comprise, in order along the optical path from the front aperture to the image sensor:
 a concave mirror; and
 a convex mirror.

8. The eye-mounted device of claim 7, further comprising:
 an obscuration that blocks extraneous rays from the external environment from reaching the image sensor.

9. The eye-mounted device of claim 8, where the obscuration is annular in shape and an inner edge of the annular obscuration is adjacent to an outer edge of the secondary mirror.

10. The eye-mounted device of claim 7, further comprising:
a sidewall baffle that is external to the primary mirror and blocks extraneous rays from the external environment from reaching the image sensor at oblique angles.

11. The eye-mounted device of claim 10, where the sidewall baffle extends beyond an entrance aperture of the optics.

12. The eye-mounted device of claim 7, further comprising:
a solid transparent substrate with the concave mirror on one side of the substrate and with the convex mirror on an opposite side of the substrate, where none of the optical path is in air.

13. The eye-mounted device of claim 7, where the femtocamera has a full field of view of not more than twenty degrees.

14. The eye-mounted device of claim 1, where the optics comprise:
an imaging lens located approximately at the front aperture; and
two turning mirrors that turn the optical path so that the image sensor faces towards the user's eye.

15. The eye-mounted device of claim 14, further comprising:
a solid transparent substrate with the imaging lens on one side of the substrate and with the two turning mirrors on an opposite side of the substrate.

16. The eye-mounted device of claim 15, where the lens is a curved surface of the solid transparent substrate.

17. The eye-mounted device of claim 15, where surfaces of the solid transparent substrate are coated to reduce extraneous light from the external environment from entering the substrate.

18. The eye-mounted device of claim 14, where the lens is a biconvex lens.

19. The eye-mounted device of claim 14, further comprising:
a baffle that separates a portion of the optical path from the lens to a first of the turning mirrors and a portion of the optical path from the second of the turning mirrors to the image sensor.

20. The eye-mounted device of claim 14, where the femtocamera has a full field of view of at least 20°.

* * * * *